US012561938B2

(12) United States Patent
Khemka et al.

(10) Patent No.: US 12,561,938 B2
(45) Date of Patent: Feb. 24, 2026

(54) EFFICIENT PIXEL DENSITY MEASUREMENT OF STITCHED IMAGES

(71) Applicant: NVIDIA Corporation, Santa Clara, CA (US)

(72) Inventors: Animesh Khemka, Fremont, CA (US); Nikhil Krishna Parab, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 55 days.

(21) Appl. No.: 18/615,699

(22) Filed: Mar. 25, 2024

(65) Prior Publication Data

US 2025/0299467 A1 Sep. 25, 2025

(51) Int. Cl.

| | |
|---|---|
| *G06T 19/00* | (2011.01) |
| *G06T 7/136* | (2017.01) |
| *G06T 7/187* | (2017.01) |
| *G06T 7/55* | (2017.01) |
| *G06T 15/00* | (2011.01) |
| *G06V 10/10* | (2022.01) |
| *G06V 10/26* | (2022.01) |
| *G06V 10/44* | (2022.01) |
| *G06V 10/46* | (2022.01) |
| *G06V 20/70* | (2022.01) |

(52) U.S. Cl.
CPC .............. *G06V 10/46* (2022.01); *G06T 7/136* (2017.01); *G06T 7/187* (2017.01); *G06T 7/55* (2017.01); *G06T 15/005* (2013.01); *G06T 19/00* (2013.01); *G06V 10/16* (2022.01); *G06V 10/26* (2022.01); *G06V 10/457* (2022.01); *G06V 20/70* (2022.01); *G06T 2207/20084* (2013.01); *G06T 2207/20212* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 7,425,984 B2 * | 9/2008 | Chen | ........................ G06T 15/20 348/218.1 |
| 2023/0316458 A1 * | 10/2023 | Ren | ....................... H04N 5/2624 382/100 |
| 2023/0316635 A1 * | 10/2023 | Jiang | ....................... G06V 20/56 345/418 |

FOREIGN PATENT DOCUMENTS

| | | | | |
|---|---|---|---|---|
| KR | 20180073778 A | * | 7/2018 | ........... G06T 19/003 |

* cited by examiner

*Primary Examiner* — Saptarshi Mazumder
(74) *Attorney, Agent, or Firm* — Lowenstein Sandler LLP

(57) ABSTRACT

A first synthetic image including a first pattern and a second synthetic image including a second pattern are processed to generated a stitched image comprising a modified version of the first synthetic image and a modified version of the second synthetic image. One or more features of the first pattern are deformed in the modified version of the first synthetic image and one or more features of the second pattern are deformed in the modified version of the second synthetic image. Pixel areas are determined for each feature of the modified version of the first synthetic image and for each feature of the modified version of the second synthetic image. Feature densities are determined for one or more regions of the stitched image based on the determined pixel areas.

20 Claims, 15 Drawing Sheets

600

Process a first synthetic image including a first pattern and a second synthetic image including a second pattern to generate a stitched image including a modified version of the first synthetic image and a modified version of the second synthetic image, where one or more features of the first pattern are deformed in the modified version of the first synthetic image and one or more features of the second pattern are deformed in the modified version of the second synthetic image 602

Determine pixel areas for each feature of the modified version of the first synthetic image and for each feature of the modified version of the second synthetic image 604

Perform a thresholding process on the stitched image to obtain a binary image, where the features of the modified version of the first synthetic image and features of the modified version of the second synthetic image are classified as foreground objects 606

Provide the binary image as input to a connected components algorithm, where the connected components algorithm provides, as output, a labeled image including multiple connected components, where each connected component is assigned a unique identifier corresponding to a feature of the modified version of the first synthetic image or a feature of the modified version of the second synthetic image 608

Determine pixel areas for each connected component using one or more shape analysis algorithms 610

Determine feature densities for one or more regions of the stitched image based on the determined pixel areas 612

Determine feature densities based on area ratios between the pixel areas of the features of the modified version of the first synthetic image and the second synthetic image and corresponding pixel areas of the features of the first synthetic image and the second synthetic image, where the area ratios indicate magnification levels of respective features 614

Determine orientations of each connected component using a covariance matrix of associated pixel coordinates, wherein the orientations indicate a direction of deformation associated with the deformed features of the first pattern or the deformed features of the second pattern 616

Generate a vector map based on the pixel areas of the features of the modified version of the first synthetic image and the second synthetic image and associated orientations of the features of the first synthetic image and the second synthetic image 618

Responsive to a determination that one or more feature densities within a first area of the stitched image are below a first threshold density, adjust a first parameter associated with a stitching algorithm that generates the stitched images 620

Responsive to a determination that one or more feature densities within a second area of the stitched image are below a second threshold density, adjust a second parameter associated with the stitching algorithm 622

200

250

252

254

300

Pixel Density Component 310

Segmentation Component 312

Feature Analyzer 314

Map Generator 316

Image Stitching Pipeline 101

MEMORY 330

Synthetic Images 332

Synthetic Stitched Image 334

Measurements 336

Pixel Density Map 338

400
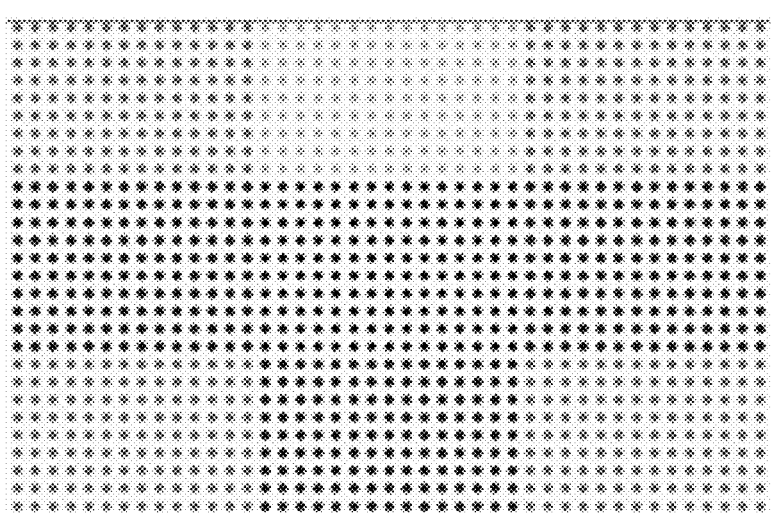
FIG. 4A
450
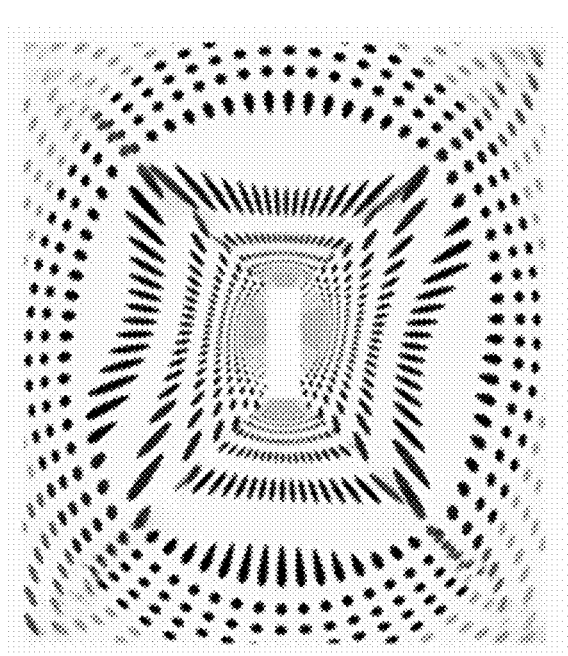
FIG. 4B

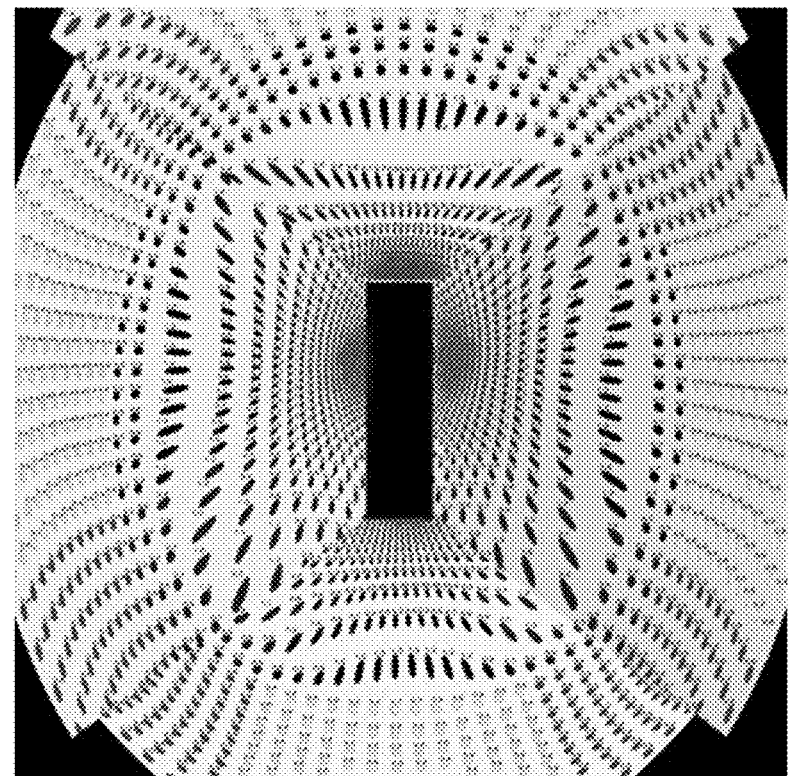
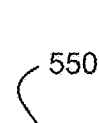
FIG. 5A
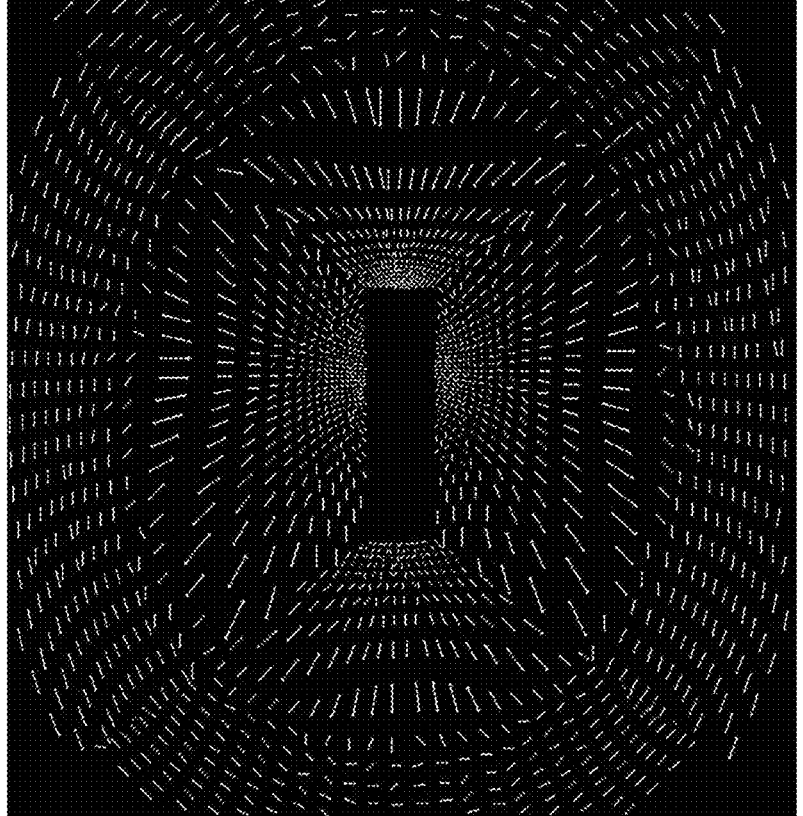
FIG. 5B

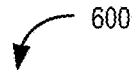

600

Process a first synthetic image including a first pattern and a second synthetic image including a second pattern to generate a stitched image including a modified version of the first synthetic image and a modified version of the second synthetic image, where one or more features of the first pattern are deformed in the modified version of the first synthetic image and one or more features of the second pattern are deformed in the modified version of the second synthetic image 602

Determine pixel areas for each feature of the modified version of the first synthetic image and for each feature of the modified version of the second synthetic image 604

Perform a thresholding process on the stitched image to obtain a binary image, where the features of the modified version of the first synthetic image and features of the modified version of the second synthetic image are classified as foreground objects 606

Provide the binary image as input to a connected components algorithm, where the connected components algorithm provides, as output, a labeled image including multiple connected components, where each connected component is assigned a unique identifier corresponding to a feature of the modified version of the first synthetic image or a feature of the modified version of the second synthetic image 608

Determine pixel areas for each connected component using one or more shape analysis algorithms 610

Determine feature densities for one or more regions of the stitched image based on the determined pixel areas 612

Determine feature densities based on area ratios between the pixel areas of the features of the modified version of the first synthetic image and the second synthetic image and corresponding pixel areas of the features of the first synthetic image and the second synthetic image, where the area ratios indicate magnification levels of respective features 614

Determine orientations of each connected component using a co-variance matrix of associated pixel coordinates, wherein the orientations indicate a direction of deformation associated with the deformed features of the first pattern or the deformed features of the second pattern 616

Generate a vector map based on the pixel areas of the features of the modified version of the first synthetic image and the second synthetic image and associated orientations of the features of the first synthetic image and the second synthetic image 618

Responsive to a determination that one or more feature densities within a first area of the stitched image are below a first threshold density, adjust a first parameter associated with a stitching algorithm that generates the stitched images 620

Responsive to a determination that one or more feature densities within a second area of the stitched image are below a second threshold density, adjust a second parameter associated with the stitching algorithm 622

EFFICIENT PIXEL DENSITY MEASUREMENT OF STITCHED IMAGES

TECHNICAL FIELD

Embodiments disclosed herein generally pertain to image processing, and more specifically, to efficient pixel density measurement of stitched images.

BACKGROUND

As there is an increase in the use of technology for fully-automated or semi-automated tasks, such as may relate to autonomous driving and robotics, there is a corresponding increase in the desire to provide accurate information relevant to operation of that technology. This can include, for example, capturing live video of an environment in which this technology is operating and providing an accurate video representation. To provide a view-consistent representation, video data captured from multiple cameras can be combined through a process such as image stitching to create a stitched or composite representation. In some instances, deformation can be introduced during the image stitching process that can affect pixel density Traditionally, known solutions rely on real captures and exhaustive manual measurements to determine pixel density measurements.

BRIEF DESCRIPTION OF DRAWINGS

FIG. 4A illustrates an example synthetic image provided as input to an image stitching pipeline, in accordance with at least one embodiment of the present disclosure.

FIG. 4B illustrates an example synthetic stitched image received as output from an image stitching pipeline, in accordance with at least one embodiment of the present disclosure.

FIG. 5A illustrates an example pixel density map associated with a synthetic stitched image produced by an image stitching pipeline, in accordance with at least one embodiment of the present disclosure.

FIG. 5B illustrates an example vector map associated with a synthetic stitched image produced by an image stitching pipeline, in accordance with at least one embodiment of the present disclosure.

FIG. 6 illustrates a flow diagram of an example method of measuring pixel density of a synthetic stitched image, in accordance with at least one embodiment of the present disclosure.

DETAILED DESCRIPTION

Figure 1:
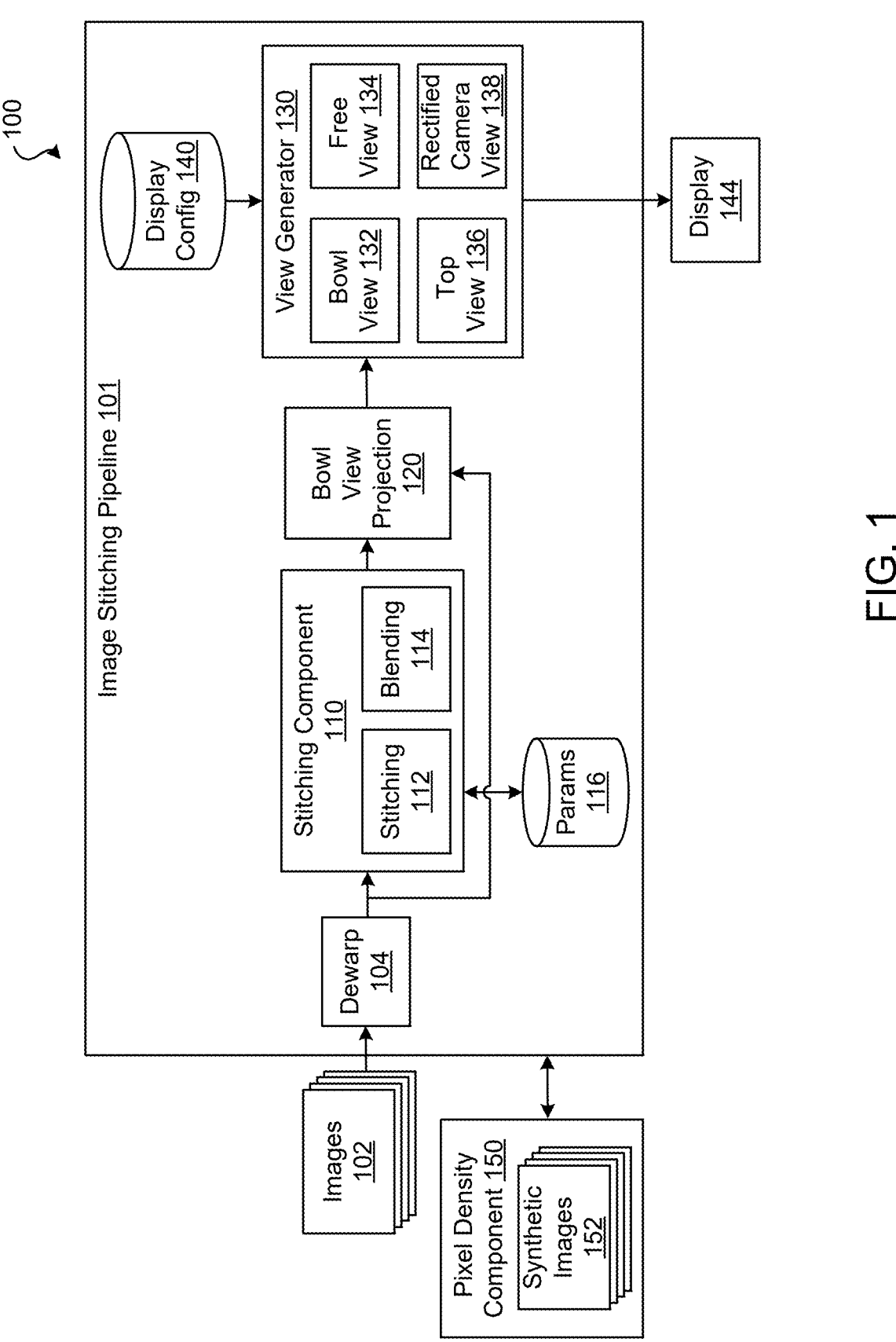
FIG. 1 illustrates an example computing environment for determining noise profiles for image sensors based on image data, in accordance with at least one embodiment of the present disclosure.

Camera image sensors are used in a wide variety of applications across various industries. For example, smartphones, video surveillance systems, automotives, medical imaging devices, and the like use image sensors to capture image data and video data for various purposes. In some instances, video data captured from multiple cameras can be combined through a process such as image stitching to create a combined or composite representation of an environment. Image stitching can be leveraged by a variety of applications to provide a more comprehensive view of a scene and enhance understanding of the context in which objects exist. For example, image stitching can be used by medical imaging, surveillance, computer vision, and automotive systems for many different purposes.

In some instances, deformation can be introduced during the stitching process that can affect pixel density. Some stitching algorithms may deform or stretch images to align the images and create a seamless stitched image, leading to variations in pixel density across the stitched image. For example, a pixel corresponding to a center region of a capture device may map to a smaller region after the stitching process, while a pixel corresponding to an edge region of the capture device may map to a larger region after the stitching process, resulting in nonuniform pixel densities across the final, stitched image. Understanding and managing pixel densities of stitched images is crucial in achieving a seamless and visually coherent stitched image. For example, pixel density information can be used during an image alignment phase of a stitching algorithm to ensure precise registration of features and to avoid distortions. Additionally, quality of a stitched image may be assessed based on pixel density uniformity. Large deviations from a relatively consistent pixel density may indicate regions of a stitched image for additional refinement or adjustment during the stitching process. Accordingly, accurate and efficient measurement of pixel densities across a stitched image can be useful for image stitching.

In some instances, approaches to measure pixel densities across a stitched image use a dot array image during a calibration process of a capture device. For example, the dot array image is placed over an image sensor of the image capture device. The dot array image can be a grid of a dots or a checkerboard pattern that can provide a reference point to understand distortions introduced during the image stitching process. Images may be captured by multiple capture devices with the dot array image in place over associated image sensors. After a stitched output image is generated, the dots may be deformed (e.g., magnified, re-oriented, etc.) as a result of the stitching algorithm. Distances between centroids of the dots before image stitching and after image stitching may be manually computed. The ratio of the stitched image's dot-to-dot distance, divided by its original value may be an estimate of pixel density. However, such an approach is manual (e.g., includes physically placing the dot array image over the image sensor during a calibration process) and labor intensive. Additionally, the method may provide results that vary and are difficult to reproduce during subsequent measurements. Furthermore, deployment of the capture device can be hindered by manual scene setup and human error introduced during the manual calibration process.

In accordance with embodiments described herein, an introduced technique includes a method to automatically measure pixel density of a stitched image. To measure pixel density, synthetic images may be generated and provided as input to an image stitching system. The synthetic images may be automatically generated by the system or provided, for example, by a user/administrator associated with the system. The synthetic images may include a fixed pattern of feature shapes such as a grid of equidistant dots or a grid of equidistant squares. Each feature of a synthetic image may correspond to a region of images captured by the associated capture device. The synthetic image may be duplicated for each capture device in the system and provided as input to an associated image stitching algorithm. The stitching algorithm may produce a stitched output image including regions associated with each of the input synthetic images. The stitched output image may include deformed shapes, magnified and/or re-oriented according to parameters associated with the stitching algorithm. Each of the deformed shapes may correspond to the shapes of the synthetic images provided as input. The system may measure the area of each shape in the input images and corresponding shapes in the stitched output image. Ratios between areas of input and output shapes can indicate a pixel density of a region of output images stitched by the stitching algorithm relative to a pixel density of input images. In an illustrative example, a first feature associated with a first input synthetic image may have a pixel area of 10 pixels. The stitching algorithm may produce a corresponding deformed feature with a pixel area of 16 pixels. Accordingly, the pixel density of the deformed feature may be 1.6 (16/10). In some embodiments, the pixel density may be a magnification level (e.g., 1.6× magnification) of the deformed feature.

In some embodiments, to determine areas of features in the stitched output images, the system may first segment each feature using one or more computer vision techniques. For example, thresholding techniques may be applied to the stitched output image to produce a binary image. Pixels with intensity values above a threshold intensity level may be labeled as foreground pixels, and pixels with intensity values below the threshold intensity level may be labeled as background pixels. The result is a binary image where one or more shapes in the binary image are labeled as foreground pixels, and everything else is labeled as background pixels. The binary image can be provided as input to a connected components algorithm. The connected components algorithm can produce an image in which each shape is labeled as a separate connected component. Shape properties for the connected components can be determined based on one or more shape analysis algorithms. For example, an orientation, area, and/or eccentricity of each connected component can be determined using one or more Hu-Moments. Pixel density ratios/magnification levels may be determine based on the computed areas.

In some embodiments, a pixel density map may be created by combining magnification and orientation of each deformed shape. Each point of the pixel density map may be associated with a deformed feature and may indicate a magnification level and an orientation of the deformed feature.

Some solutions do not use synthetic images (e.g., do not use synthetic images with fixed patterns). For example, traditional solutions do not use synthetic images to automatically determine pixel densities of output images output by an image stitching pipeline. Rather, such solutions rely on real image captures and exhaustive manual measurements using a grid array. Such a manual system is labor intensive and difficult to scale across many image capture devices.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing one or more generative AI operations, systems for performing synthetic data generation operations, systems implemented at least partially in a data center, systems for performing conversational AI operations, systems implementing one or more large language models (LLMs), systems implementing one or more visual language models (VLMs), systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

It is appreciated that aspects and implementations of the present disclosure are often described with respect to an autonomous vehicles by way of example, and not by way of limitation. Noting that aspects and implementations of the present disclosure can be applied to numerous systems, such as image stitching pipelines implemented within surveillance systems, medical imaging systems, robotics, virtual reality, augmented reality, and the like.

FIG. 1 illustrates an example system 100 that can be used in accordance with various embodiments. In this example, a set of images 102 is received as input, as may be received from multiple cameras associated with a given device or system, or positioned with respect to a given environment, among other such options. In at least one embodiment, these images will represent two or more different views of an environment that are, at most, partially overlapping. These images may represent a full, or partial, view of a scene, location, or environment. This image data may include "live" data that is streamed or transmitted shortly after image capture, and/or may include image data captured previously and provided in a more offline fashion. Such an image may also be in various color spaces, such as red green blue (RGB), Commission on Illumination lab (CIELAB), cyan magenta yellow key (CMYK), luminance chrominance (YIQ), luminance chrominance blue chrominance yellow (YCbCr), luminance blue projection red projection (YUV), hue saturation value (HSV), or hue saturation light (HSL), among other such options.

Images 102 can be provided to an image stitching pipeline 101 that can use these input images 102 to generate an output view or stitched/composite image, or video stream, for presentation via at least one display 144, such as a monitor, projector, or wearable display, among other such options. In this example, images 102 can be provided to a dewarping component 104. Dewarping can refer to the process of correcting distortions, such as lens distortion, perspective distortion, and the like. In at least one embodiment, dewarping component 104 can apply one or more geometric transformations (e.g., affine transformations, homography transformations, polynomial transformations, etc.) to images 102 to correct such distortion.

Dewarped images can be provided to a stitching component 110 that will attempt to stitch multiple images together to generate a composite/stitched representation of the images 102. The stitching component can use any of a number of different stitching 112 or compositing algorithms, as may perform various blending 114 or other image manipulation techniques.

In at least one embodiment, image stitching pipeline 101 may use various intrinsic and extrinsic parameters of the cameras, at least to the extent values for these parameters are known and available from a camera database or other such location, in order to properly assign the image data for stitching. This may include, for example, information such as the relative poses or orientation of these different cameras, such that at least an initial stitching position and orientation can be determined for each image. It should be understood that for image stitching pipelines that receive sequences of images or streams of video frame data, the images or frames to be composited are those that correspond to, or were captured at, the same point in time or approximately the same point in time, at least to an extent to which such capture can be synchronized.

The stitching component 110 can also use values for one or more stitching 112 parameters 116, as may be stored to a parameter database or other such location. Values for these parameters can determine aspects of how component images are stitched together, as may relate to weightings or locations for blending 114 and other such aspects. Example stitching parameters include, but are not limited to, a blending 114 method (e.g., alpha blending, multiband blending or Poisson blending), blending 114 width, blending 114 alpha map shape (e.g., angular based or perpendicular based), blending 114 weights in different bands in multiband blending 114, weights in different color channels in different color spaces (e.g., RGB, CIELAB, CMYK, YIQ, YCbCr, YUV, HSV, or HSL), seam type (e.g., diagonal seam, vertical seam, or horizontal seam), and/or seam location. The stitching component 110 can use values for these various parameters with the input images 102 to generate a composite image, or stitched image, that provides a single representation of an environment, scene, or location at a point in time, such as a "current" point in time, accounting for some amount of latency in transmission and processing.

If a scene is not harmonized between cameras, it may be desirable to use a larger blending weight or radius (e.g., 200) to provide for a smoother transition between data from images. If it is a highly structured scene with multiple buildings and/or edges, for example, it may be desirable to use a smaller blending weight (e.g., 2) to avoid ghosting and other artifacts due to misalignment between cameras. Single band blending may also be used where images are blending in only one band (or a subset) of multiple bands. In at least one embodiment, images can be decomposed into different frequency bands or components, or blended in any appropriate color space (e.g., RGB, CIELAB, CMYK, YIQ, YCbCr, YUV, HSV, HSL, etc.), and different blending weights can be used for each of these bands, components, or color channels.

In at least one embodiment, image stitching pipeline 101 may project a stitched image generated by stitching component 110 onto a cylindrical surface to generate a "bowl" view projection 120. A bowl view projection 120 is a type of mapping from a three dimensional (3D) scene to a two dimensional (2D) image. In a bowl view projection 120, straight lines in the 3D scene are not preserved as straight lines in the resulting image. Rather, they appear curved, creating a wide-angle effect. In at least one embodiment, view generator 130 may use bowl view projection 120 and camera calibration parameters, such as display configurations 140, to map the bowl view projection into different views, such as may correspond to a "bowl" view 132 in a projection space, a free view 134 in a projection space, or a top-down view 136 in a projection space. The image stitching pipeline 101 may generate an output view or composite/stitched image, or video stream, for presentation via at least one display device 144, such as a monitor, projector, or wearable display, among other such options. Ultimately, image stitching pipeline 101 may generate a composite image or stitched image as output based on a set of images 102 received at an input, as illustrated below with respect to FIGS. 2A and 2B.

Figure 2A:
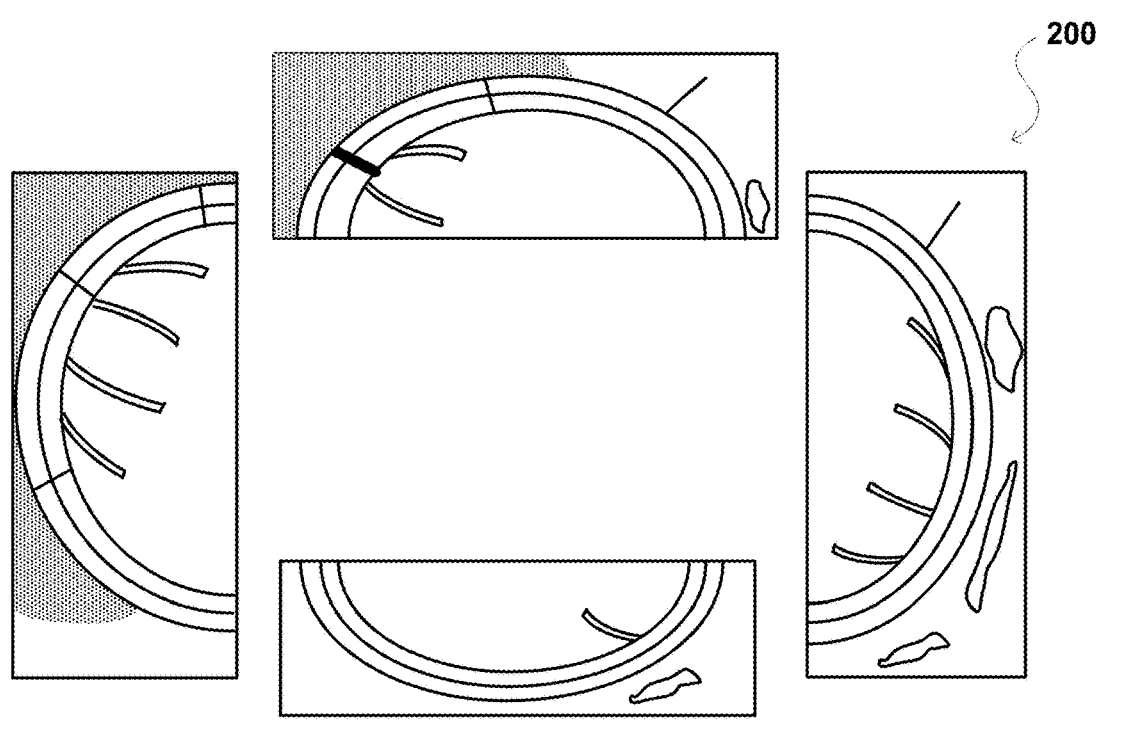
FIGS. 2A and 2B illustrated stitched images that can be generated, in accordance with at least one embodiment of the present disclosure.
Figure 2B:
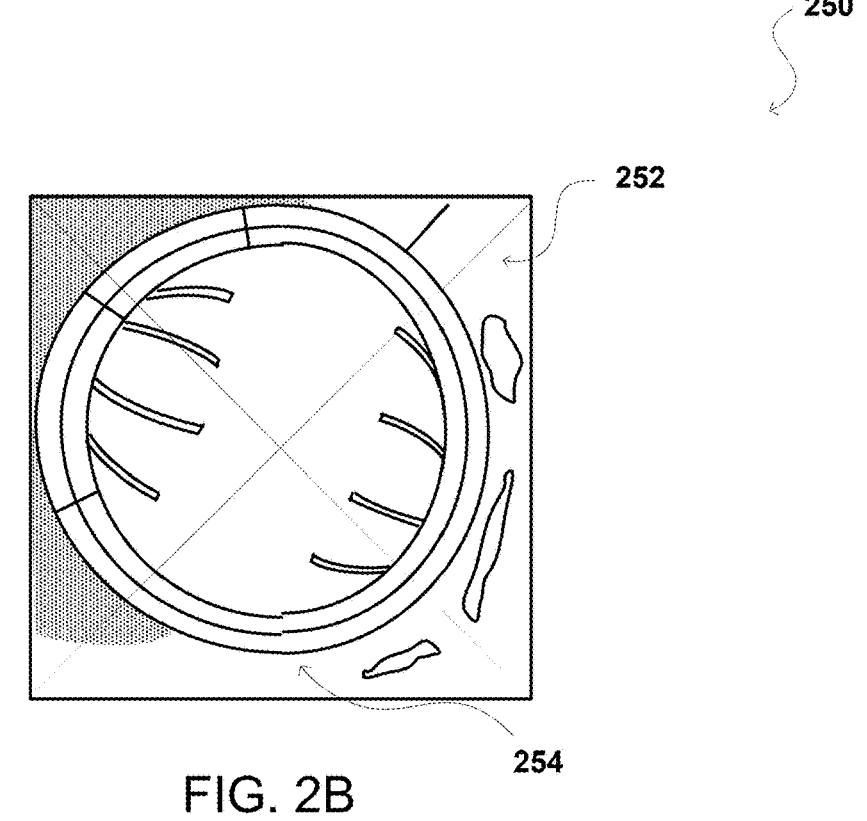

FIG. 2A illustrates a set of four images 200 that can be captured by respective cameras on, or associated with, an autonomous vehicle or other such system or device in accordance with various embodiments. In this example, the cameras have different but partially overlapping fields of view, such that the images can be stitched together without gap filling or additional image data generation, although it should be understood that there may be other situations where cameras do not produce images with at least partially overlapping views that may benefit from such tasks. In this example, each camera can have various intrinsic or extrinsic values that can impact the appearance of a captured image, where those values may relate to field of view, optical center, focal length, and/or camera pose, among other such options. As mentioned, it may be desirable to generate a single, consistent view of this surrounding environment based at least in part upon these captured images 200. This can include, for example, generating a stitched/composite image 250 as illustrated in FIG. 2B. As illustrated, such a composite image can provide a single, consistent representation of the environment, whether a full 360 degree view or at least a portion of the angular range. Such a view can be presented as a single view showing the entire image 250, or portions of the image may be displayed at different times, where that view may be controllable by a user. In this example, an angular shape alpha map is used instead of, for example, a perpendicular shape alpha map, at least to avoid the alpha discontinuity issue observed in various traditional stitching techniques. Blending region color continuity can be improved by extending the blending region(s) to hide a color discontinuity issue around corners or other such features. As illustrated in FIG. 2B, however, this composite image 250 resulting from the stitching of the constituent images 200 of FIG. 2A can have various artifacts or elements that are not realistic for the environment, and make it clear that the composite image was not captured as a single image. These can include, for example, one or more seams 252 indicating transitions between data from different frames, as well as seam misalignment, ghosting, and/or object disappearance, among other such options. This can also include areas or points of discontinuities 254 where features of the data do not align from different images, such as may result from misalignment or calibration of the respective cameras, or changes or differences in the parameters of those cameras, among other such options.

Returning to FIG. 1, in some instances, deforming (e.g., magnification, demagnification, distortion, etc.) can be introduced at one or more stages of image stitching pipeline 101 such that pixel density varies throughout the stitched image. Some stitching algorithms may deform or stretch images to align the images and create a seamless stitched image, leading to variations in pixel density across the stitched image. For example, dewarping 104, stitching component 110, and/or view generator 130 can apply one or more geometric transformations that can affect pixel density in different regions of the of the resultant stitched image. Regions of the stitched image that are heavily stretched or magnified may have an overall lower pixel density than regions of the stitched image that are demagnified.

In at least one embodiment, system 100 may include pixel density component 150 to measure pixel densities across a synthetic stitched image produced by the image stitching pipeline 101. In this example, pixel density component 150 may provide a set of synthetic images 152 as input to image stitching pipeline 101. The set of synthetic images may each include a fixed pattern of features/shapes such as a grid of equidistant dots or a grid of equidistance squares. In at least one embodiment, each synthetic image in the set may depict the same pattern of features. The synthetic images 152 may be generated by image stitching component 150 or retrieved from an image database or other such location.

Pixel density component 150 can provide synthetic images to image stitching pipeline that can use these input synthetic images 101 to generate a stitched synthetic image. In at least one embodiment, image stitching pipeline can provide a stitched synthetic image to pixel density component 150 after any stage of the pipeline for pixel density analysis. For example, image stitching pipeline 101 can provide a stitched synthetic output image at the output dewarping 104, stitching component 110, view generator 130, or any other stage of image stitching pipeline 101.

The stitched output image may include deformed features, magnified or re-oriented according to parameters (e.g., parameters 116, display configurations 140, etc.) associated with image stitching pipeline 101. Each of the deformed features may correspond to features/regions of respective synthetic images 152. Pixel density component 150 may operate to measure the area of each feature in the input images and corresponding features in the stitched output image. Ratios between areas of input and output features can indicate a pixel density of a regions of output images stitched by image stitching pipeline 101 relative to a pixel density of input images 102. For example, deforming of features of synthetic images 152 may indicate the same deforming of corresponding regions of images 102 provided as input to image stitching pipeline 101. Pixel density component 150 may determine pixel densities (e.g., magnifications, orientations, etc.) according to one or more techniques described below with respect to FIG. 3.

Figure 3:
FIG. 3 is a block diagram illustrating an example pixel density component for determining pixel densities, in accordance with at least one embodiment of the present disclosure.

FIG. 3 is a block diagram 300 illustrating an example pixel density component for determining pixel densities, in accordance with at least one embodiment of the present disclosure. In at least one embodiment, pixel density component 310 can include segmentation component 312, feature analyzer 314, and map generator 316. In at least one embodiment, pixel density component 310 can corresponding to pixel density component 150 associated with FIG. 1. In at least one embodiment, pixel density component can be connected (e.g., via a network, via a communication bus, etc.) to a memory 330. In at least one embodiment, pixel density component 310 can be connected (e.g., via a network, via a communication bus, etc.) to image stitching pipeline 101.

Pixel density component 310 may provide a set of synthetic images 334 as input to image stitching pipeline 101 and receive a synthetic stitched image 334 as output from image stitching pipeline 101. Synthetic images 334 may each include a fixed pattern of features/shapes and synthetic stitched image 334 may include corresponding features/shapes deformed as a result of one or more stages of image stitching pipeline 101. An example synthetic image 332 is illustrated below with respect to FIG. 4A and an example synthetic stitched image 334 is illustrated below with respect to FIG. 4B.

FIG. 4A illustrates an example synthetic image 400 provided as input to an image stitching pipeline, such as image stitching pipeline 101. Synthetic image 400 includes a grid or pattern of evenly spaced dots (referred to as "features" herein). It is appreciated that the pattern of dots is used herein by way of example, and not by way of limitation, noting that any fixed pattern of features (e.g., a fixed pattern of squares, crosses, stars, etc.) can be used herein. Each dot illustrated in synthetic image 400 may have known, equal area, such as a pixel area of 10 pixels.

FIG. 4B illustrates an example synthetic stitched image 450 received as output from an image stitching pipeline. Specifically, synthetic stitched image 450 can be the product of the same four synthetic images 400 (each associated with a different camera facing in a different direction, such as front, back, left and right of an automobile) stitched using an image stitching pipeline, such as image stitching pipeline 101. As shown in image 450, multiple dots have been deformed (e.g., magnified, reoriented, etc.) as a result of one or more components of the image stitching pipeline.

Returning to FIG. 3, Pixel density component 310 may operate to determine pixel density measurements based on ratios between areas (e.g., area in pixels) of features of the synthetic images 332 and corresponding areas (e.g., area in pixels) of features of synthetic stitched image 334. To determine feature areas of synthetic stitched image 334, pixel density component 310 can provide synthetic stitched image 334 as input to segmentation component 312.

To determine areas of features in synthetic stitched image 332, segmentation component 312 may first segment each feature using one or more computer vision techniques. For example, thresholding techniques may be applied to synthetic stitched image 334 to produce a binary image. Segmentation component 310 may iterate (row-by-row, column-by-column, etc.) through each pixel of synthetic stitched image and label each pixel as a foreground pixel (e.g., labeled as '1') or background pixel (e.g., labeled as '0') to produce a binary image. Each pixel at or above a threshold color value may be a labeled as a foreground pixel corresponding to a feature while each pixel below a threshold color value may be labeled as a background pixel not corresponding to a feature. Because noise in synthetic stitched image 334 is absent, the thresholding process can accurately identify features of the synthetic stitched image 334.

The result of the thresholding process is a binary image in which shapes/features are labeled as foreground pixels and everything else is labeled as background pixels. In at least one embodiment, segmentation component 312 may further use a connected components algorithm to produce an image in which each feature/shape of the binary image is labeled as a separate connected component. A connected component is a set of pixels that are contiguous and share a common property or characteristic, such as a common binary label. In at least one embodiment, segmentation component 312 can leverage one or more connected component algorithms to identify deformed features in synthetic stitched image 334. In an illustrative example, a connected components algorithm may define a connectively criterion for determining connectivity between pixels of the binary image. Connectivity criterion may include, for example, 4-way connectivity (e.g., pixels that share an edge are considered connected), 8-way connectivity (pixels that share and edge or a corner are considered connected), and the like. Starting at a predetermined pixel of the binary image, the algorithm may recursively explore neighboring pixels to identify connected components. Neighboring pixels can be added to a connected component if they meet the connectively criteria. This process can continue until no neighboring pixels meet the connectively criteria, at which point the algorithm can proceed to a next unmarked pixel. Once a connected component is identified, the algorithm can assign the component a unique identifier. In at least one embodiment, each connected component can be a deformed feature in synthetic stitched image 334. Segmentation component 312 can provide synthetic stitched image 334 with labeled connected components to feature analyzer 314 for further processing. It is appreciated that the technique described with respect to segmentation component 312 is used by of example, and not by way of limitation. For example, segmentation component 312 may use various segmentation techniques (e.g., thresholding, one or more machine learning models, etc.) in conjunction with one or more connected components algorithms with varying criteria (e.g., 8-way connectively, 4-way connectivity, etc.) to produce a synthetic stitched image 334 with uniquely labeled features.

Feature analyzer 314 may use one or more shape analysis algorithms to determine statistics/shape properties (e.g., symmetry, skewness, elongation, etc.) for features (e.g., connected components) of synthetic stitched image 334. For example, features of the synthetic stitched image can be mathematically described by computing one or more Hu-Moment statistics. Hu-Moments include a set of seven invariant (translation, rotation, and scale invariant) image moments for shape analysis and recognition. In computer vision, image moments are quantitative descriptors that can be used to characterize the shape of an object in an image. Image moments may capture the area of the object, the centroid (e.g., the center coordinate of the object) of the object, the orientation of the object, among other properties and statistics. For example, the i-th order moment of an image I can be defined by the following equation:

$$M_{ij} = \sum_x \sum_y x^i y^j I(x, y) \tag{1}$$

Where i and j represent the order of the moment and $I(x, y)$ denote intensity value of the pixel at coordinates $(x, y)$, such that only non-zero pixel values are counted in the summation. For example, if i=0 (i.e., the $0^{th}$ order moment), the labeled synthetic stitched image 334 computed according to equation (1) may be a summation of non-zero pixels in the synthetic stitched image 334 (e.g., the number of pixels corresponding to a deformed feature of the image).

In another example, central moments may be calculated and used to quantify the spatial distribution of shapes/features in an image. Central moments are invariant to translation, meaning that central moment is independent of the location of the shape/feature within the image. The p-th order central moment of and Image I can be defined by the following equation:

$$m_{pq} = \sum_x \sum_y (x - \bar{x})^p (y - \bar{y})^q I(x, y) \tag{2}$$

Where p and q represent the order of the moment and $I(x, y)$ denote intensity value of the pixel at coordinates $(x, y)$, $\bar{x}$ is the average value of x across the image I, and $\bar{y}$ is the average value of y across the image I.

In at least one embodiment, the zeroth order central moment $(m_{00})$ can represent the area of a deformed feature/shape of the synthetic stitched image 334. Each deformed feature/shape of synthetic stitched image 334 can correspond to a feature of synthetic images 332 with a predetermined area. Feature analyzer 314 can calculate a ratio of the area of features in the synthetic stitched image 334 and the known area of corresponding features in the synthetic images 332. In an illustrative example, feature analyzer 314 may calculate the area of a deformed feature of synthetic stitched image 334 to be 16 pixels using equation (2). A predetermined area of the corresponding feature in the synthetic image may be a pixel area of 10 pixels. Accordingly, feature analyzer may compute the pixel area ratio of the deformed feature to be 1.6 (16/10). In some embodiments, the pixel area ratio may indicate a magnification level (e.g., 1.6× magnification) of the deformed feature. In at least one embodiment, feature analyzer 314 can determine pixel area ratios for each feature in the synthetic stitched image 334 and store the pixel area ratios (magnifications) as a measurement included in measurements 336.

In at least one embodiment, feature analyzer 314 can compute orientation of deformed features using the above-described Hu-Moments. Orientation describes the direction of the major axis of a feature (the axis that runs through the centroid and along the widest part of the feature). In an illustrative example, feature analyzer 314 can estimate orientation of a feature's shape using the following Co-Variance Matrix:

$$C = \frac{1}{m_{00}} \begin{bmatrix} m_{20} & m_{11} \\ m_{11} & m_{02} \end{bmatrix} \qquad (3)$$

Eigenvectors of this matrix can correspond to major and minor axes of the image intensity. The orientation can thus be extracted from the angle of the eigenvector associated with the largest eigenvalue toward the axis closest to this eigenvector. This orientation angle, $\theta$, can be calculated using the following equation:

$$\tan 2\theta = \left( \frac{2m_{11}}{2m_{20} - 2m_{02}} \right) \qquad (4)$$

Where $m_{11}$ is the first-order central moment representing covariance between the x and y coordinates, $m_{20}$ and $m_{02}$ are the second-order central moments representing the variances along the x and y axes, respectively, and $\theta$ is the orientation angle or tilt of the feature's shape relative to the coordinate axes. In at least one embodiment, orientation angle $\theta$ can be included as a measurement within measurement 336.

In at least one embodiment, feature analyzer 314 can compute eccentricity of deformed features using the Covariance Matrix (3) above. Eccentricity is a measure of how elongated or stretched a feature's shape is. Feature analyzer 314 can determine eccentricity of a feature using eigenvalues of the Covariance Matrix (3). For example, the length of a semi-major axis is given by $2\sqrt{\lambda_1}$, and the length of a semi-minor axis is given by $2\sqrt{\lambda_2}$. In at least one embodiment, eccentricity can be included as a measurement within the measurements 336.

In at least one embodiment, map generator 316 can operate to generate a pixel density map of synthetic stitched image 334 using one or more of measurement 336, illustrated below with respect to FIGS. 5A and 5B. For example, map generator 316 can generate a pixel density map by combining magnifications and orientations of each deformed feature.

FIG. 5A illustrates an example pixel density map 500 associated with a synthetic stitched image produced by an image stitching pipeline, in accordance with at least one embodiment of the present disclosure. Each deformed dot in the pixel density map 500 may correspond to a feature of a raw synthetic image, such as synthetic image 400 of FIG. 4, that has been magnified, stretched, and/or otherwise deformed by image stitching pipeline. Each deformed dot in the pixel density map 500 may be quantitatively described using a magnification level and an orientation calculated according to feature/shape analysis techniques described above.

FIG. 5B illustrates an example vector map 550 associated with a synthetic stitched image produced by an image stitching pipeline, in accordance with at least one embodiment of the present disclosure. Each vector in the vector map 500 may correspond to a feature of a raw synthetic image, such as synthetic image 400 of FIG. 4, that has been magnified, stretched, and/or otherwise deformed by image stitching pipeline. Each vector in the pixel density map 500 may be quantitatively described using a magnification level and an orientation calculated according to feature analysis techniques described above. For example, the magnitude of a vector may represent a magnification level of the deformed feature and the direction of the vector may represent the orientation of the deformed feature.

Returning to FIG. 3, in at least one embodiment, to generate pixel density map 338, map generator 316 may divide synthetic stitched image 334 into fixed-sized pixels blocks (e.g., 32×32 pixel blocks, 32×64 pixel blocks, 64×64 pixel blocks, etc.). Map generator 316 can average pixel densities (magnification levels) and orientations for all features in each block and generate pixel density map by combining the averaged pixel magnification levels and orientations of all blocks. Such a pixel density map 338 may illustrate magnification levels and orientations for different regions of the synthetic stitched image 334.

In at least one embodiment, pixel density component 310 may update one or more parameters (e.g., parameters 116, display configurations 140, etc.) of an image stitching pipeline (e.g., image stitching pipeline 101) and/or image stitching algorithm based on one or more determined measurements 336. For example, pixel density component 310 can adjust one or more parameters based on computed pixel densities (magnification levels) of deformed features. Responsive to a determination that a pixel density of a deformed feature is below a pre-determined threshold pixel density, pixel density component 310 may adjust one or more parameters of the image stitching pipeline to ensure that the image stitching pipeline limits compression in a corresponding area of stitched images so the threshold is met. In at least one embodiment, thresholds can be determined (e.g., by a user, a developer, etc.) to ensure that the image stitching pipeline produces high-quality stitched images with minimal information loss. In at least one embodiment, different areas or regions (and features included within those areas) of synthetic stitched image 334 may be assigned (e.g., by a user, a developer, etc.) different pixel density thresholds. In at least one embodiment, thresholds can be determined for other measurements 336, such as feature orientations, eccentricity, etc.

FIG. 6 illustrates a flow diagram of an example method 600 of measuring pixel density of a synthetic stitched image, in accordance with at least one embodiment of the present disclosure. For the sake of simplicity and clarity, method 600 is depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term "article of manufacture," as used herein, is intended to encompass a computer-readable device or storage media provided with a computer program and/or executable instructions that, when executed, affect one or more operations. In some embodiments, the method 600 can be performed by processing logic (e.g., processing circuitry) of a computing device.

At operation 602 of method 600, the processing logic can process a first synthetic image including a first pattern and a second synthetic image including a second pattern to generate a stitched image including a modified version of the first synthetic image and a modified version of the second synthetic image. One or more features of the first pattern are deformed in the modified version of the first synthetic image and one or more features of the second pattern are deformed in the modified version of the second synthetic image. In at least one embodiment, the first pattern and the second pattern include multiple dots (or other features) arranged in a grid, such as illustrated with respect to FIG. 4A. In at least one embodiment, the first synthetic image and the second synthetic image are a same image including a same pattern. In at least one embodiment, the processing logic can determine the first synthetic image and the second synthetic image.

At operation 604 of method 600, the processing logic can determine pixel areas for each feature of the modified version of the first synthetic image and for each feature of the modified version of the second synthetic image. In at least one embodiment, to determine the pixel areas, the processing logic can perform operations 606 through 610.

At operation 606 of method 600, the processing logic can perform a thresholding process on the stitched image to obtain a binary image. The features of the modified version of the first synthetic image and features of the modified version of the second synthetic image may be classified as foreground objects.

At operation 608 of method 600, the processing logic can further provide the binary image as input to a connected components algorithm. The connected components algorithm provides, as output, a labeled image including multiple connected components. Each connected component is assigned a unique identifier corresponding to a feature of the modified version of the first synthetic image or a feature of the modified version of the second synthetic image.

At operation 610 of method 600, the processing logic can further determine pixel areas for each connected component using one or more shape analysis algorithms.

At operation 612 of method 600, the processing logic can determine feature densities for one or more regions of the stitched image based on the determined pixel areas. In at least one embodiment, to determine feature densities, the processing logic can perform operation 614.

At operation 614 of method 600, the processing logic can determine feature densities based on area ratios between the pixel areas of the features of the modified version of the first synthetic image and the second synthetic image and corresponding pixel areas of the features of the first synthetic image and the second synthetic image. The area ratios indicate magnification levels of respective features. In at least one embodiment, feature densities are determined at one or more stages of an image stitching pipeline, such as image stitching pipeline 101.

At operation 616 of method 600, the processing logic can determine orientations of each connected component using a co-variance matrix of associated pixel coordinates. The orientations indicate a direction of deformation associated with the deformed features of the first pattern or the deformed features of the second pattern.

At operation 618 of method 600, the processing logic can generate a vector map based on the pixel areas of the features of the modified version of the first synthetic image and the second synthetic image and associated orientations of the features of the first synthetic image and the second synthetic image.

At operation 620 of method 600, the processing logic can adjust a first parameter associated with a stitching algorithm that generates the stitched images responsive to a determination that one or more feature densities within a first area of the stitched image are below a first threshold density.

At operation 622 of method 600, the processing logic can adjust a second parameter associated with the stitching algorithm responsive to a determination that one or more feature densities within a second area of the stitched image are below a second threshold density. In at least one embodiment, the first parameter and/or the second parameter can be adjusted according to one or more other criteria. Such criteria may include thresholds associated with computed statistics associated with the stitched image computing according to one or more of the above-described shape analysis techniques. The computed statistics, for example, may include Hu-Moment statistics such as eccentricity, orientation, and/or other Hu-Moments.

Values for the first and second parameters can determine aspects of how component images are stitched together, as may relate to weightings or locations for blending and other such aspects. Example stitching parameters include, but are not limited to, a blending method (e.g., alpha blending, multiband blending or Poisson blending), blending width, blending alpha map shape (e.g., angular based or perpendicular based), blending weights in different bands in multiband blending, weights in different color channels in different color spaces (e.g., RGB, CIELAB, CMYK, YIQ, YCbCr, YUV, HSV, or HSL), seam type (e.g., diagonal seam, vertical seam, or horizontal seam), and/or seam location.

Figure 7:
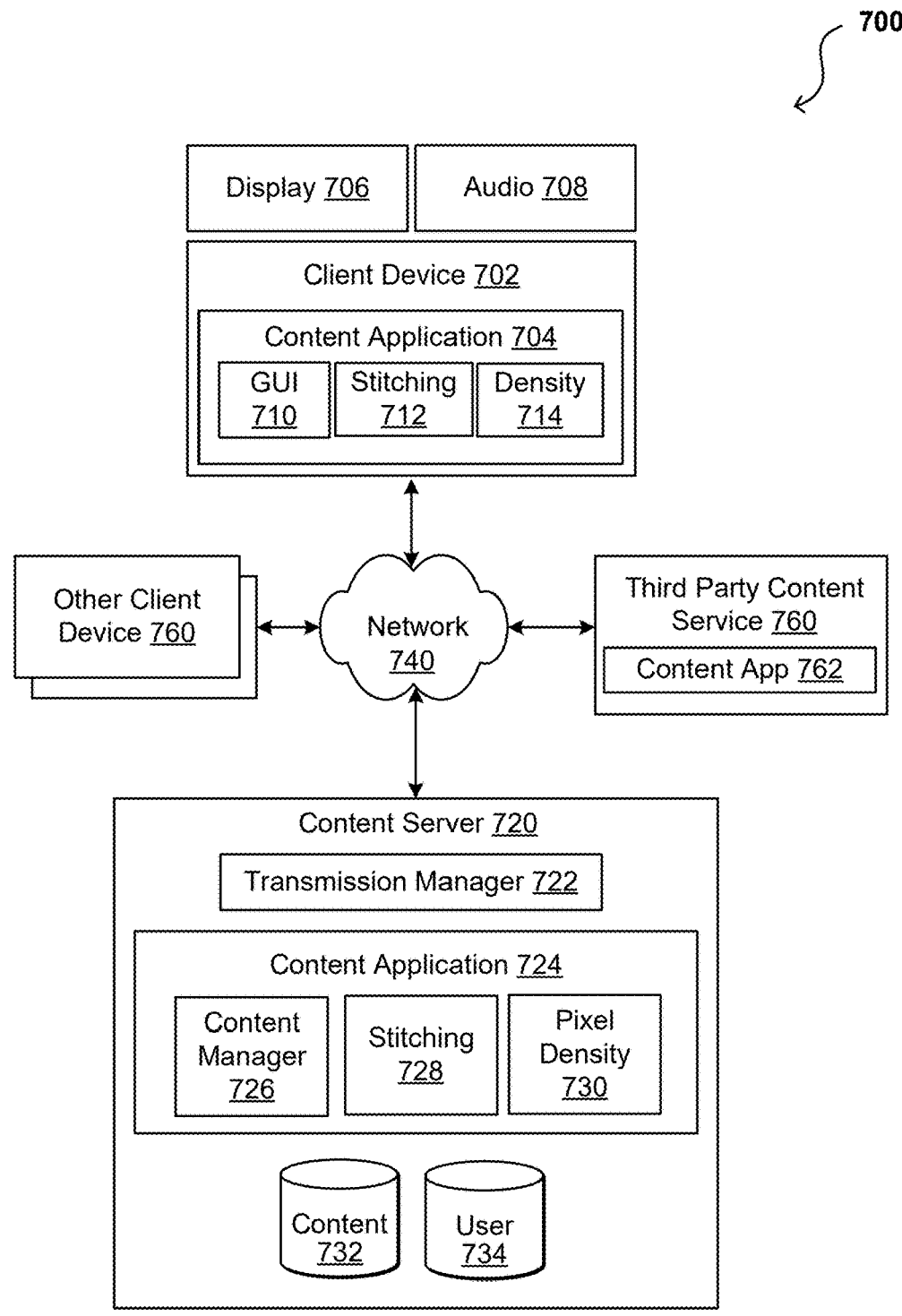
FIG. 7 illustrates an example network configuration 700 that can be used to provide, generate, modify, encode, and/or transmit content in accordance with at least one embodiment of the present disclosure.

FIG. 7 illustrates an example network configuration 700 that can be used to provide, generate, modify, encode, and/or transmit content. In at least one embodiment, a client device 702 can generate or receive content for a session using components of a content application 704 on client device 702 and data stored locally on that client device. In at least one embodiment, a content application 724 (e.g., an image generation or editing application) executing on content server 720 (e.g., a cloud server or edge server) may initiate a session associated with at least client device 702, as may use a session manager and user data stored in a user database 734, and can cause content 732 to be determined by a content manager 726. An image stitching component 728 may obtain image data for a scene or environment and generate a composite representation of that scene or environment. In at least one embodiment, image stitching component 728 can generate a stitched representation of multiple synthetic images. A pixel density component 730 can determine pixel densities of features in the multiple synthetic images according to techniques described herein. At least a portion of that content may then be transmitted to client device 702 using an appropriate transmission manager 722 to send by download, streaming, or another such transmission channel. An encoder may be used to encode and/or compress this data before transmitting to the client device 702. In at least one embodiment, this content 732 can include video or image data for a scene. In at least one embodiment, client device 702 receiving this content can provide this content to a corresponding content application 704, which may also or alternatively include a stitching component 712 or pixel density component 714 for stitching image data received to, or captured by, the client device 702. A decoder may also be used to decode data received over the network(s) 740 for presentation via client device 702, such as image or video content through a display 706 and audio, such as sounds and music, through at least one audio playback device 708, such as speakers or headphones. In at least one embodiment, at least some of this content may already be stored on, rendered on, or accessible to client device 702 such that transmission over network 740 is not required for at least that portion of content, such as where that content may have been previously downloaded or stored locally on a hard drive or optical disk. In at least one embodiment, a transmission mechanism such as data streaming can be used to transfer this content from server 720, or content database 734, to client device 702. In at least one embodiment, at least a portion of this content can be obtained or streamed from another source, such as a third party content service 760 that may also include a content application 762 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Figure 8A:
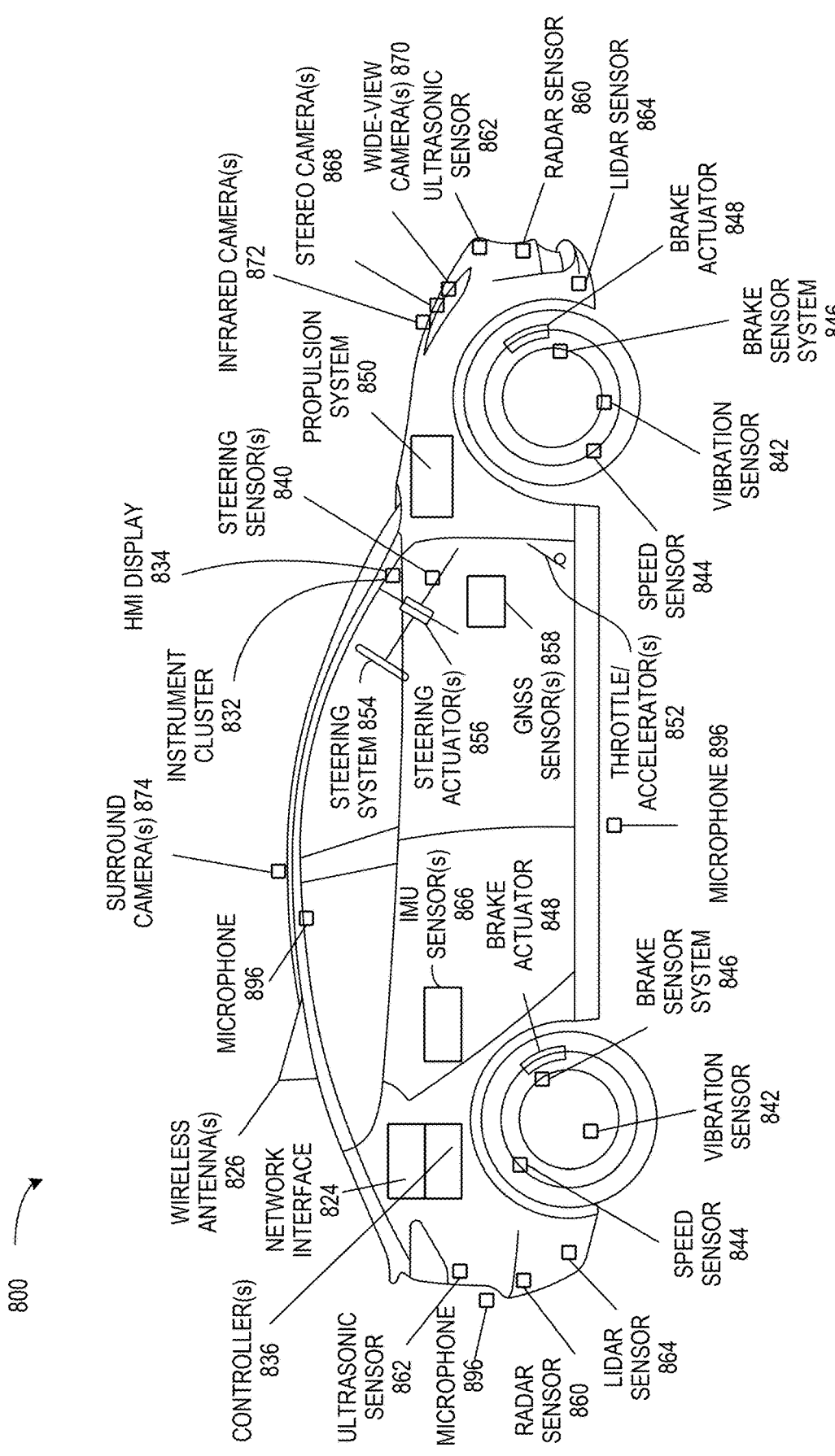
FIG. 8A illustrates an example of an autonomous vehicle, according to at least one embodiment.

FIG. 8A illustrates an example of an autonomous vehicle 800, according to at least one embodiment. In at least one embodiment, autonomous vehicle 800 (alternatively referred to herein as "vehicle 800") may be, without limitation, a passenger vehicle, such as a car, a truck, a bus, and/or another type of vehicle that accommodates one or more passengers. In at least one embodiment, vehicle 800 may be a semi-tractor-trailer truck used for hauling cargo. In at least one embodiment, vehicle 800 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 800 may be capable of functionality in accordance with one or more of Level 1 through Level 5 of autonomous driving levels. For example, in at least one embodiment, vehicle 800 may be capable of conditional automation (Level 3), high automation (Level 4), and/or full automation (Level 5), depending on embodiment.

In at least one embodiment, vehicle 800 may include, without limitation, components such as a chassis, a vehicle body, wheels (e.g., 2, 4, 6, 8, 18, etc.), tires, axles, and other components of a vehicle. In at least one embodiment, vehicle 800 may include, without limitation, a propulsion system 850, such as an internal combustion engine, hybrid electric power plant, an all-electric engine, and/or another propulsion system type. In at least one embodiment, propulsion system 850 may be connected to a drive train of vehicle 800, which may include, without limitation, a transmission, to enable propulsion of vehicle 800. In at least one embodiment, propulsion system 850 may be controlled in response to receiving signals from a throttle/accelerator(s) 852.

In at least one embodiment, a steering system 854, which may include, without limitation, a steering wheel, is used to steer vehicle 800 (e.g., along a desired path or route) when propulsion system 850 is operating (e.g., when vehicle 800 is in motion). In at least one embodiment, steering system 854 may receive signals from steering actuator(s) 856. In at least one embodiment, a steering wheel may be optional for full automation (Level 5) functionality. In at least one embodiment, a brake sensor system 846 may be used to operate vehicle brakes in response to receiving signals from brake actuator(s) 848 and/or brake sensors.

In at least one embodiment, controller(s) 836, which may include, without limitation, one or more system on chips ("SoCs") (not shown in FIG. 8A) and/or graphics processing unit(s) ("GPU(s)"), provide signals (e.g., representative of commands) to one or more components and/or systems of vehicle 800. For instance, in at least one embodiment, controller(s) 836 may send signals to operate vehicle brakes via brake actuator(s) 848, to operate steering system 854 via steering actuator(s) 856, to operate propulsion system 850 via throttle/accelerator(s) 852. In at least one embodiment, controller(s) 836 may include one or more onboard (e.g., integrated) computing devices that process sensor signals, and output operation commands (e.g., signals representing commands) to enable autonomous driving and/or to assist a human driver in driving vehicle 800. In at least one embodiment, controller(s) 836 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 836 provide signals for controlling one or more components and/or systems of vehicle 800 in response to sensor data received from one or more sensors (e.g., sensor inputs). In at least one embodiment, sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit ("IMU") sensor(s) 866 (e.g., accelerometer(s), gyroscope(s), a magnetic compass or magnetic compasses, magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range cameras (not shown in FIG. 8A), mid-range camera(s) (not shown in FIG. 8A), speed sensor(s) 844 (e.g., for measuring speed of vehicle 800), vibration sensor(s) 842, steering sensor(s) 840, brake sensor(s) (e.g., as part of brake sensor system 846), and/or other sensor types.

In at least one embodiment, one or more of controller(s) 836 may receive inputs (e.g., represented by input data) from an instrument cluster 832 of vehicle 800 and provide outputs (e.g., represented by output data, display data, etc.) via a human-machine interface ("HMI") display 834, an audible annunciator, a loudspeaker, and/or via other components of vehicle 800. In at least one embodiment, outputs may include information such as vehicle velocity, speed, time, map data (e.g., a High Definition map (not shown in FIG. 8A), location data (e.g., vehicle's 800 location, such as on a map), direction, location of other vehicles (e.g., an occupancy grid), information about objects and status of objects as perceived by controller(s) 836, etc. For example, in at least one embodiment, HMI display 834 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 800 further includes a network interface 824 which may use wireless antenna(s) 826 and/or modem(s) to communicate over one or more networks. For example, in at least one embodiment, network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 826 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Pixel density component 150 may be used to perform image processing operations, including pixel density computations, associated with one or more embodiments. Details regarding pixel density component 150 are provided herein in conjunction with FIG. 1. In at least one embodiment, pixel density component may be used in the autonomous vehicle 800 of FIG. 8A for performing image processing operations, including pixel density computations.

Figure 8B:
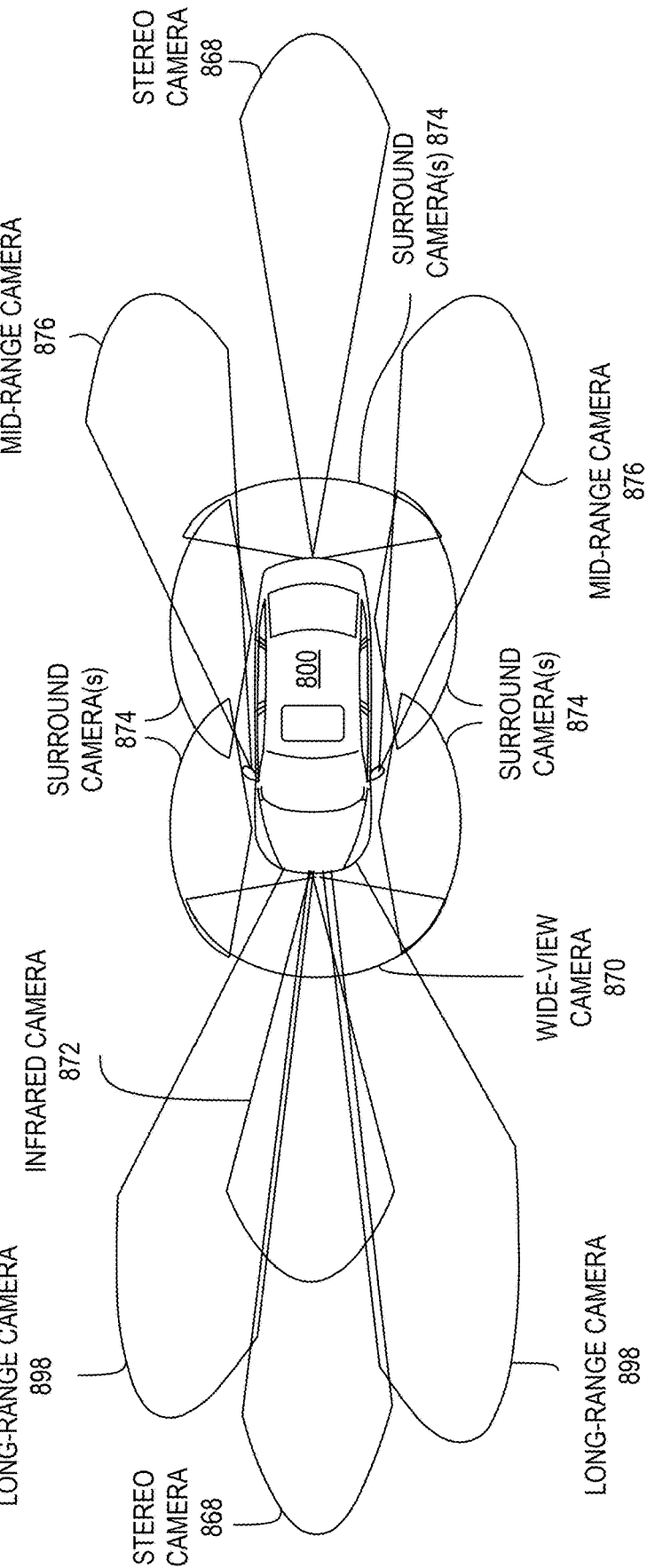
FIG. 8B illustrates an example of camera locations and fields of view for the autonomous vehicle of FIG. 8A, according to at least one embodiment.

FIG. 8B illustrates an example of camera locations and fields of view for autonomous vehicle 800 of FIG. 8A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 800.

In at least one embodiment, camera types for cameras may include, but are not limited to, digital cameras that may be adapted for use with components and/or systems of vehicle 800. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within vehicle 800 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 800 (e.g., front-facing cameras) may be used for surround view, to help identify forward facing paths and obstacles, as well as aid in, with help of one or more of controller(s) 836 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 870 may be used to perceive objects coming into view from a periphery (e.g., pedestrians, crossing traffic or bicycles). Although only one wide-view camera 870 is illustrated in FIG. 8B, in other embodiments, there may be any number (including zero) wide-view cameras on vehicle 800. In at least one embodiment, any number of long-range camera(s) 898 (e.g., a long-view stereo camera pair) may be used for depth-based object detection, especially for objects for which a neural network has not yet been trained. In at least one embodiment, long-range camera(s) 898 may also be used for object detection and classification, as well as basic object tracking.

In at least one embodiment, any number of stereo camera(s) 868 may also be included in a front-facing configuration. In at least one embodiment, one or more of stereo camera(s) 868 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 800, including a distance estimate for all points in an image. In at least one embodiment, one or more of stereo camera(s) 868 may include, without limitation, compact stereo vision sensor(s) that may include, without limitation, two camera lenses (one each on left and right) and an image processing chip that may measure distance from vehicle 800 to target object and use generated information (e.g., metadata) to activate autonomous emergency braking and lane departure warning functions. In at least one embodiment, other types of stereo camera(s) 868 may be used in addition to, or alternatively from, those described herein.

In at least one embodiment, cameras with a field of view that include portions of environment to sides of vehicle 800 (e.g., side-view cameras) may be used for surround view, providing information used to create and update an occupancy grid, as well as to generate side impact collision warnings. For example, in at least one embodiment, surround camera(s) 874 (e.g., four surround cameras as illustrated in FIG. 8B) could be positioned on vehicle 800. In at least one embodiment, surround camera(s) 874 may include, without limitation, any number and combination of wideview cameras, fisheye camera(s), 360-degree camera(s), and/or similar cameras. For instance, in at least one embodiment, four fisheye cameras may be positioned on a front, a rear, and sides of vehicle 800. In at least one embodiment, vehicle 800 may use three surround camera(s) 874 (e.g., left, right, and rear), and may leverage one or more other camera(s) (e.g., a forward-facing camera) as a fourth surround-view camera.

In at least one embodiment, cameras with a field of view that include portions of an environment behind vehicle 800 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 898 and/or mid-range camera(s) 876, stereo camera(s) 868), infrared camera(s) 872, etc.), as described herein.

Pixel density component 150 may be used to perform image processing operations, including pixel density computations, associated with one or more embodiments. Details regarding pixel density component 150 are provided herein in conjunction with FIG. 1. In at least one embodiment, pixel density component may be used in the autonomous vehicle 800 of FIG. 8B for performing image processing operations, including pixel density computations.

Figure 8C:
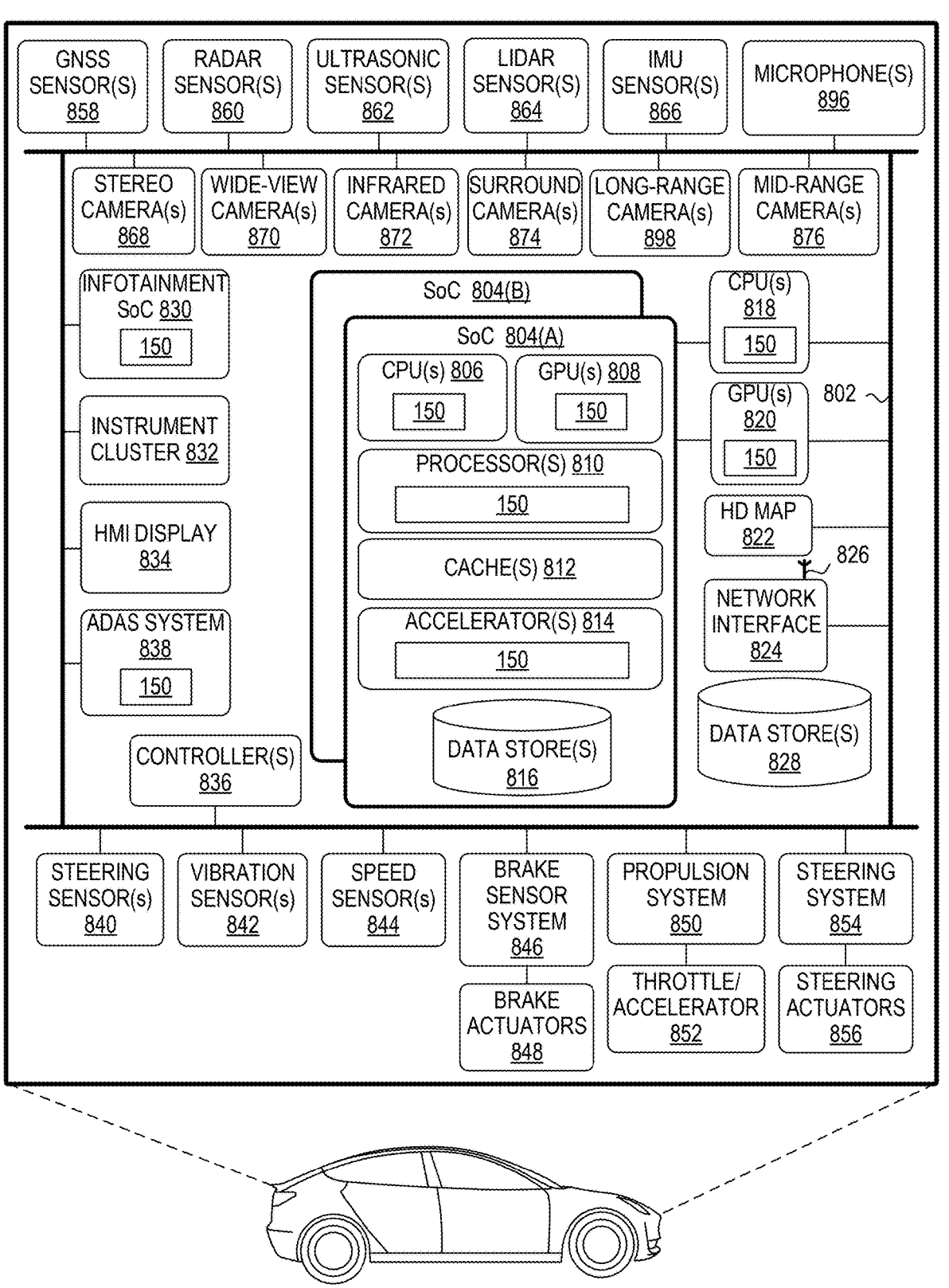
FIG. 8C is a block diagram illustrating an example system architecture for the autonomous vehicle of FIG. 8A, according to at least one embodiment.

FIG. 8C is a block diagram illustrating an example system architecture for autonomous vehicle 800 of FIG. 8A, according to at least one embodiment. In at least one embodiment, each of components, features, and systems of vehicle 800 in FIG. 8C is illustrated as being connected via a bus 802. In at least one embodiment, bus 802 may include, without limitation, a CAN data interface (alternatively referred to herein as a "CAN bus"). In at least one embodiment, a CAN may be a network inside vehicle 800 used to aid in control of various features and functionality of vehicle 800, such as actuation of brakes, acceleration, braking, steering, windshield wipers, etc. In at least one embodiment, bus 802 may be configured to have dozens or even hundreds of nodes, each with its own unique identifier (e.g., a CAN ID). In at least one embodiment, bus 802 may be read to find steering wheel angle, ground speed, engine revolutions per minute ("RPMs"), button positions, and/or other vehicle status indicators. In at least one embodiment, bus 802 may be a CAN bus that is ASIL B compliant.

In at least one embodiment, in addition to, or alternatively from CAN, FlexRay and/or Ethernet protocols may be used. In at least one embodiment, there may be any number of busses forming bus 802, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 802 may communicate with any of components of vehicle 800, and two or more busses of bus 802 may communicate with corresponding components. In at least one embodiment, each of any number of system(s) on chip(s) ("SoC(s)") 804 (such as SoC 804 (A) and SoC 804 (B), each of controller(s) 836, and/or each computer within vehicle may have access to same input data (e.g., inputs from sensors of vehicle 800), and may be connected to a common bus, such CAN bus.

In at least one embodiment, vehicle 800 may include one or more controller(s) 836, such as those described herein with respect to FIG. 8A. In at least one embodiment, controller(s) 836 may be used for a variety of functions. In at least one embodiment, controller(s) 836 may be coupled to any of various other components and systems of vehicle 800, and may be used for control of vehicle 800, artificial intelligence of vehicle 800, infotainment for vehicle 800, and/or other functions.

In at least one embodiment, vehicle 800 may include any number of SoCs 804. In at least one embodiment, each of SoCs 804 may include, without limitation, central processing units ("CPU(s)") 806, graphics processing units ("GPU(s)") 808, processor(s) 810, cache(s) 812, accelerator(s) 814, data store(s) 816, and/or other components and features not illustrated. In at least one embodiment, SoC(s) 804 may be used to control vehicle 800 in a variety of platforms and systems. For example, in at least one embodiment, SoC(s) 804 may be combined in a system (e.g., system of vehicle 800) with a High Definition ("HD") map 822 which may obtain map refreshes and/or updates via network interface 824 from one or more servers (not shown in FIG. 8C).

In at least one embodiment, CPU(s) 806 may include a CPU cluster or CPU complex (alternatively referred to herein as a "CCPLEX"). In at least one embodiment, CPU(s) 806 may include multiple cores and/or level two ("L2") caches. For instance, in at least one embodiment, CPU(s) 806 may include eight cores in a coherent multi-processor configuration. In at least one embodiment, CPU(s) 806 may include four dual-core clusters where each cluster has a dedicated L2 cache (e.g., a 2 megabyte (MB) L2 cache). In at least one embodiment, CPU(s) 806 (e.g., CCPLEX) may be configured to support simultaneous cluster operations enabling any combination of clusters of CPU(s) 806 to be active at any given time.

In at least one embodiment, one or more of CPU(s) 806 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/ Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 806 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 808 may include an integrated GPU (alternatively referred to herein as an "iGPU"). In at least one embodiment, GPU(s) 808 may be programmable and may be efficient for parallel workloads. In at least one embodiment, GPU(s) 808 may use an enhanced tensor instruction set. In at least one embodiment, GPU(s) 808 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 808 may include at least eight streaming microprocessors. In at least one embodiment, GPU(s) 808 may use compute application programming interface(s) (API(s)). In at least one embodiment, GPU(s) 808 may use one or more parallel computing platforms and/or programming models (e.g., NVIDIA's CUDA model).

In at least one embodiment, one or more of GPU(s) 808 may be power-optimized for best performance in automotive and embedded use cases. For example, in at least one embodiment, GPU(s) 808 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 808 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 808 may include unified memory technology. In at least one embodiment, address translation services ("ATS") support may be used to allow GPU(s) 808 to access CPU(s) 806 page tables directly. In at least one embodiment, embodiment, when a GPU of GPU(s) 808 memory management unit ("MMU") experiences a miss, an address translation request may be transmitted to CPU(s) 806. In response, 2 CPU of CPU(s) 806 may look in its page tables for a virtual-to-physical mapping for an address and transmit translation back to GPU(s) 808, in at least one embodiment. In at least one embodiment, unified memory technology may allow a single unified virtual address space for memory of both CPU(s) 806 and GPU(s) 808, thereby simplifying GPU(s) 808 programming and porting of applications to GPU(s) 808.

In at least one embodiment, GPU(s) 808 may include any number of access counters that may keep track of frequency of access of GPU(s) 808 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 804 may include any number of cache(s) 812, including those described herein. For example, in at least one embodiment, cache(s) 812 could include a level three ("L3") cache that is available to both CPU(s) 806 and GPU(s) 808 (e.g., that is connected to CPU(s) 806 and GPU(s) 808). In at least one embodiment, cache(s) 812 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 804 may include one or more accelerator(s) 814 (e.g., hardware accelerators, software accelerators, or a combination thereof). In at least one embodiment, SoC(s) 804 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 808 and to off-load some of tasks of GPU(s) 808 (e.g., to free up more cycles of GPU(s) 808 for performing other tasks). In at least one embodiment, accelerator(s) 814 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 814 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 808, and by using an inference accelerator, for example, a designer may target either DLA(s) or GPU(s) 808 for any function. For example, in at least one embodiment, a designer may focus processing of CNNs and floating point operations on DLA(s) and leave other functions to GPU(s) 808 and/or accelerator(s) 814.

In at least one embodiment, accelerator(s) 814 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 838, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 806. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 814 may include a computer vision network on-chip and static random-access memory ("SRAM"), for providing a high-bandwidth, low latency SRAM for accelerator(s) 814. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 804 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 814 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 800, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 6D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 866 that correlates with vehicle 800 orientation, distance, 3D location estimates of object obtained from neural network and/or other sensors (e.g., LIDAR sensor(s) 864 or RADAR sensor(s) 860), among others.

In at least one embodiment, one or more of SoC(s) 804 may include data store(s) 816 (e.g., memory). In at least one embodiment, data store(s) 816 may be on-chip memory of SoC(s) 804, which may store neural networks to be executed on GPU(s) 808 and/or a DLA. In at least one embodiment, data store(s) 816 may be large enough in capacity to store multiple instances of neural networks for redundancy and safety. In at least one embodiment, data store(s) 816 may comprise L2 or L3 cache(s).

In at least one embodiment, one or more of SoC(s) 804 may include any number of processor(s) 810 (e.g., embedded processors). In at least one embodiment, processor(s) 810 may include a boot and power management processor that may be a dedicated processor and subsystem to handle boot power and management functions and related security enforcement. In at least one embodiment, a boot and power management processor may be a part of a boot sequence of SoC(s) 804 and may provide runtime power management services. In at least one embodiment, a boot power and management processor may provide clock and voltage programming, assistance in system low power state transitions, management of SoC(s) 804 thermals and temperature sensors, and/or management of SoC(s) 804 power states. In at least one embodiment, each temperature sensor may be implemented as a ring-oscillator whose output frequency is proportional to temperature, and SoC(s) 804 may use ring-oscillators to detect temperatures of CPU(s) 806, GPU(s) 808, and/or accelerator(s) 814. In at least one embodiment, if temperatures are determined to exceed a threshold, then a boot and power management processor may enter a temperature fault routine and put SoC(s) 804 into a lower power state and/or put vehicle 800 into a chauffeur to safe stop mode (e.g., bring vehicle 800 to a safe stop).

In at least one embodiment, processor(s) 810 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 810 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 810 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 810 may further include a real-time camera engine that may include, without limitation, a dedicated processor subsystem for handling real-time camera management. In at least one embodiment, processor(s) 810 may further include a high-dynamic range signal processor that may include, without limitation, an image signal processor that is a hardware engine that is part of a camera processing pipeline.

In at least one embodiment, processor(s) 810 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 870, surround camera(s) 874, and/or on in-cabin monitoring camera sensor(s). In at least one embodiment, in-cabin monitoring camera sensor(s) are preferably monitored by a neural network running on another instance of SoC 804, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 808 are not required to continuously render new surfaces. In at least one embodiment, when GPU(s) 808 are powered on and active doing 3D rendering, a video image compositor may be used to offload GPU(s) 808 to improve performance and responsiveness.

In at least one embodiment, one or more SoC of SoC(s) 804 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 804 may further include an input/output controller(s) that may be controlled by software and may be used for receiving I/O signals that are uncommitted to a specific role.

In at least one embodiment, one or more Soc of SoC(s) 804 may further include a broad range of peripheral interfaces to enable communication with peripherals, audio encoders/decoders ("codecs"), power management, and/or other devices. In at least one embodiment, SoC(s) 804 may be used to process data from cameras (e.g., connected over Gigabit Multimedia Serial Link and Ethernet channels), sensors (e.g., LIDAR sensor(s) 864, RADAR sensor(s) 860, etc. that may be connected over Ethernet channels), data from bus 802 (e.g., speed of vehicle 800, steering wheel position, etc.), data from GNSS sensor(s) 858 (e.g., connected over a Ethernet bus or a CAN bus), etc. In at least one embodiment, one or more SoC of SoC(s) 804 may further include dedicated high-performance mass storage controllers that may include their own DMA engines, and that may be used to free CPU(s) 806 from routine data management tasks.

In at least one embodiment, SoC(s) 804 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 804 may be faster, more reliable, and even more energy-efficient and space-efficient than conventional systems. For example, in at least one embodiment, accelerator(s) 814, when combined with CPU(s) 806, GPU(s) 808, and data store(s) 816, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 420) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 808. In at least one embodiment, a CNN for facial recognition and vehicle owner identification may use data from camera sensors to identify presence of an authorized driver and/or owner of vehicle 800. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 804 provide for security against theft and/or carjacking.

In at least one embodiment, a CNN for emergency vehicle detection and identification may use data from microphones 896 to detect and identify emergency vehicle sirens. In at least one embodiment, SoC(s) 804 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 858. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 862, until emergency vehicles pass.

In at least one embodiment, vehicle 800 may include CPU(s) 818 (e.g., discrete CPU(s), or dCPU(s)), that may be coupled to SoC(s) 804 via a high-speed interconnect (e.g., PCIe). In at least one embodiment, CPU(s) 818 may include an X86 processor, for example. CPU(s) 818 may be used to perform any of a variety of functions, including arbitrating potentially inconsistent results between ADAS sensors and SoC(s) 804, and/or monitoring status and health of controller(s) 836 and/or an infotainment system on a chip ("infotainment SoC") 830, for example.

In at least one embodiment, vehicle 800 may include GPU(s) 820 (e.g., discrete GPU(s), or dGPU(s)), that may be coupled to SoC(s) 804 via a high-speed interconnect (e.g., NVIDIA's NVLINK channel). In at least one embodiment, GPU(s) 820 may provide additional artificial intelligence functionality, such as by executing redundant and/or different neural networks and may be used to train and/or update neural networks based at least in part on input (e.g., sensor data) from sensors of a vehicle 800.

In at least one embodiment, vehicle 800 may further include network interface 824 which may include, without limitation, wireless antenna(s) 826 (e.g., one or more wireless antennas for different communication protocols, such as a cellular antenna, a Bluetooth antenna, etc.). In at least one embodiment, network interface 824 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 40 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 800 information about vehicles in proximity to vehicle 800 (e.g., vehicles in front of, on a side of, and/or behind vehicle 800). In at least one embodiment, such aforementioned functionality may be part of a cooperative adaptive cruise control functionality of vehicle 800.

In at least one embodiment, network interface 824 may include an SoC that provides modulation and demodulation functionality and enables controller(s) 836 to communicate over wireless networks. In at least one embodiment, network interface 824 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 800 may further include data store(s) 828 which may include, without limitation, off-chip (e.g., off SoC(s) 404) storage. In at least one embodiment, data store(s) 828 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 800 may further include GNSS sensor(s) 858 (e.g., GPS and/or assisted GPS sensors), to assist in mapping, perception, occupancy grid generation, and/or path planning functions. In at least one embodiment, any number of GNSS sensor(s) 858 may be used, including, for example and without limitation, a GPS using a USB connector with an Ethernet-to-Serial (e.g., RS-232) bridge.

In at least one embodiment, vehicle 800 may further include RADAR sensor(s) 860. In at least one embodiment, RADAR sensor(s) 860 may be used by vehicle 800 for long-range vehicle detection, even in darkness and/or severe weather conditions. In at least one embodiment, RADAR functional safety levels may be ASIL B. In at least one embodiment, RADAR sensor(s) 860 may use a CAN bus and/or bus 802 (e.g., to transmit data generated by RADAR sensor(s) 860) for control and to access object tracking data, with access to Ethernet channels to access raw data in some examples. In at least one embodiment, a wide variety of RADAR sensor types may be used. For example, and without limitation, RADAR sensor(s) 860 may be suitable for front, rear, and side RADAR use. In at least one embodiment, one or more sensor of RADAR sensors(s) 860 is a Pulse Doppler RADAR sensor.

In at least one embodiment, RADAR sensor(s) 860 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 860 may help in distinguishing between static and moving objects and may be used by ADAS system 838 for emergency brake assist and forward collision warning. In at least one embodiment, sensors 860($s$) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 800 surroundings at higher speeds with minimal interference from traffic in adjacent lanes. In at least one embodiment, another two antennae may expand field of view, making it possible to quickly detect vehicles entering or leaving a lane of vehicle 800.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 860 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 838 for blind spot detection and/or lane change assist.

In at least one embodiment, vehicle 800 may further include ultrasonic sensor(s) 862. In at least one embodiment, ultrasonic sensor(s) 862, which may be positioned at a front, a back, and/or side location of vehicle 800, may be used for parking assist and/or to create and update an occupancy grid. In at least one embodiment, a wide variety of ultrasonic sensor(s) 862 may be used, and different ultrasonic sensor(s) 862 may be used for different ranges of detection (e.g., 2.5 m, 4 m). In at least one embodiment, ultrasonic sensor(s) 862 may operate at functional safety levels of ASIL B.

In at least one embodiment, vehicle 800 may include LIDAR sensor(s) 864. In at least one embodiment, LIDAR sensor(s) 864 may be used for object and pedestrian detection, emergency braking, collision avoidance, and/or other functions. In at least one embodiment, LIDAR sensor(s) 864 may operate at functional safety level ASIL B. In at least one embodiment, vehicle 800 may include multiple LIDAR sensors 864 (e.g., two, four, six, etc.) that may use an Ethernet channel (e.g., to provide data to a Gigabit Ethernet switch).

In at least one embodiment, LIDAR sensor(s) 864 may be capable of providing a list of objects and their distances for a 360-degree field of view. In at least one embodiment, commercially available LIDAR sensor(s) 864 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 864 may include a small device that may be embedded into a front, a rear, a side, and/or a corner location of vehicle 800. In at least one embodiment, LIDAR sensor(s) 864, in such an embodiment, may provide up to a 120-degree horizontal and 35-degree vertical field-of-view, with a 200 m range even for low-reflectivity objects. In at least one embodiment, front-mounted LIDAR sensor(s) 864 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 800 up to approximately 200 m. In at least one embodiment, a flash LIDAR unit includes, without limitation, a receptor, which records laser pulse transit time and reflected light on each pixel, which in turn corresponds to a range from vehicle 800 to objects. In at least one embodiment, flash LIDAR may allow for highly accurate and distortion-free images of surroundings to be generated with every laser flash. In at least one embodiment, four flash LIDAR sensors may be deployed, one at each side of vehicle 800. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 800 may further include IMU sensor(s) 866. In at least one embodiment, IMU sensor(s) 866 may be located at a center of a rear axle of vehicle 800. In at least one embodiment, IMU sensor(s) 866 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 866 may include, without limitation, accelerometers and gyroscopes. In at least one embodiment, such as in nine-axis applications, IMU sensor(s) 866 may include, without limitation, accelerometers, gyroscopes, and magnetometers.

In at least one embodiment, IMU sensor(s) 866 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 866 may enable vehicle 800 to estimate its heading without requiring input from a magnetic sensor by directly observing and correlating changes in velocity from a GPS to IMU sensor(s) 866. In at least one embodiment, IMU sensor(s) 866 and GNSS sensor(s) 858 may be combined in a single integrated unit.

In at least one embodiment, vehicle 800 may include microphone(s) 896 placed in and/or around vehicle 800. In at least one embodiment, microphone(s) 896 may be used for emergency vehicle detection and identification, among other things.

In at least one embodiment, vehicle 800 may further include any number of camera types, including stereo camera(s) 868, wide-view camera(s) 870, infrared camera(s) 872, surround camera(s) 874, long-range camera(s) 898, mid-range camera(s) 876, and/or other camera types. In at least one embodiment, cameras may be used to capture image data around an entire periphery of vehicle 800. In at least one embodiment, which types of cameras used depends on vehicle 800. In at least one embodiment, any combination of camera types may be used to provide necessary coverage around vehicle 800. In at least one embodiment, a number of cameras deployed may differ depending on embodiment. For example, in at least one embodiment, vehicle 800 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 8A and FIG. 8B.

In at least one embodiment, vehicle 800 may further include vibration sensor(s) 842. In at least one embodiment, vibration sensor(s) 842 may measure vibrations of components of vehicle 800, such as axle(s). For example, in at least one embodiment, changes in vibrations may indicate a change in road surfaces. In at least one embodiment, when two or more vibration sensors 842 are used, differences between vibrations may be used to determine friction or slippage of road surface (e.g., when a difference in vibration is between a power-driven axle and a freely rotating axle).

In at least one embodiment, vehicle 800 may include ADAS system 838. In at least one embodiment, ADAS system 838 may include, without limitation, an SoC, in some examples. In at least one embodiment, ADAS system 838 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 860, LIDAR sensor(s) 864, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 800 and automatically adjusts speed of vehicle 800 to maintain a safe distance from vehicles ahead. In at least one embodiment, a lateral ACC system performs distance keeping, and advises vehicle 800 to change lanes when necessary. In at least one embodiment, a lateral ACC is related to other ADAS applications, such as LC and CW.

In at least one embodiment, a CACC system uses information from other vehicles that may be received via network interface 824 and/or wireless antenna(s) 826 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 800), while I2V communication provides information about traffic further ahead. In at least one embodiment, a CACC system may include either or both I2V and V2V information sources. In at least one embodiment, given information of vehicles ahead of vehicle 800, a CACC system may be more reliable, and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 860, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object and may automatically apply brakes if a driver does not take corrective action within a specified time or distance parameter. In at least one embodiment, AEB system may use front-facing camera(s) and/or RADAR sensor(s) 860, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 800 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 800 if vehicle 800 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 800 is backing up. In at least one embodiment, an RCTW system includes an AEB system to ensure that vehicle brakes are applied to avoid a crash. In at least one embodiment, an RCTW system may use one or more rear-facing RADAR sensor(s) 860, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 800 itself decides, in case of conflicting results, whether to heed result from a primary computer or a secondary computer (e.g., a first controller or a second controller of controllers 436). For example, in at least one embodiment, ADAS system 838 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 838 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 804.

In at least one embodiment, ADAS system 838 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 838 may be fed into a primary computer's perception block and/or a primary computer's dynamic driving task block. For example, in at least one embodiment, if ADAS system 838 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 800 may further include infotainment SoC 830 (e.g., an in-vehicle infotainment system (IVI)). Although illustrated and described as an SoC, infotainment system SoC 830, in at least one embodiment, may not be an SoC, and may include, without limitation, two or more discrete components. In at least one embodiment, infotainment SoC 830 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 800. For example, infotainment SoC 830 could include radios, disk players, navigation systems, video players, USB and Bluetooth connectivity, carputers, in-car entertainment, WiFi, steering wheel audio controls, hands free voice control, a heads-up display ("HUD"), HMI display 834, a telematics device, a control panel (e.g., for controlling and/or interacting with various components, features, and/or systems), and/or other components. In at least one embodiment, infotainment SoC 830 may further be used to provide information (e.g., visual and/or audible) to user(s) of vehicle 800, such as information from ADAS system 838, autonomous driving information such as planned vehicle maneuvers, trajectories, surrounding environment information (e.g., intersection information, vehicle information, road information, etc.), and/or other information.

In at least one embodiment, infotainment SoC 830 may include any amount and type of GPU functionality. In at least one embodiment, infotainment SoC 830 may communicate over bus 802 with other devices, systems, and/or components of vehicle 800. In at least one embodiment, infotainment SoC 830 may be coupled to a supervisory MCU such that a GPU of an infotainment system may perform some self-driving functions in event that primary controller(s) 836 (e.g., primary and/or backup computers of vehicle 800) fail. In at least one embodiment, infotainment SoC 830 may put vehicle 800 into a chauffeur to safe stop mode, as described herein.

In at least one embodiment, vehicle 800 may further include instrument cluster 832 (e.g., a digital dash, an electronic instrument cluster, a digital instrument panel, etc.). In at least one embodiment, instrument cluster 832 may include, without limitation, a controller and/or supercomputer (e.g., a discrete controller or supercomputer). In at least one embodiment, instrument cluster 832 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 830 and instrument cluster 832. In at least one embodiment, instrument cluster 832 may be included as part of infotainment SoC 830, or vice versa.

Pixel density component 150 may be used to perform image processing operations, including pixel density computations, associated with one or more embodiments. Details regarding pixel density component 150 are provided herein in conjunction with FIG. 1. In at least one embodiment, pixel density component 150 may be used in the system architecture of FIG. 8C for performing image processing operations, including pixel density computations.

Figure 8D:
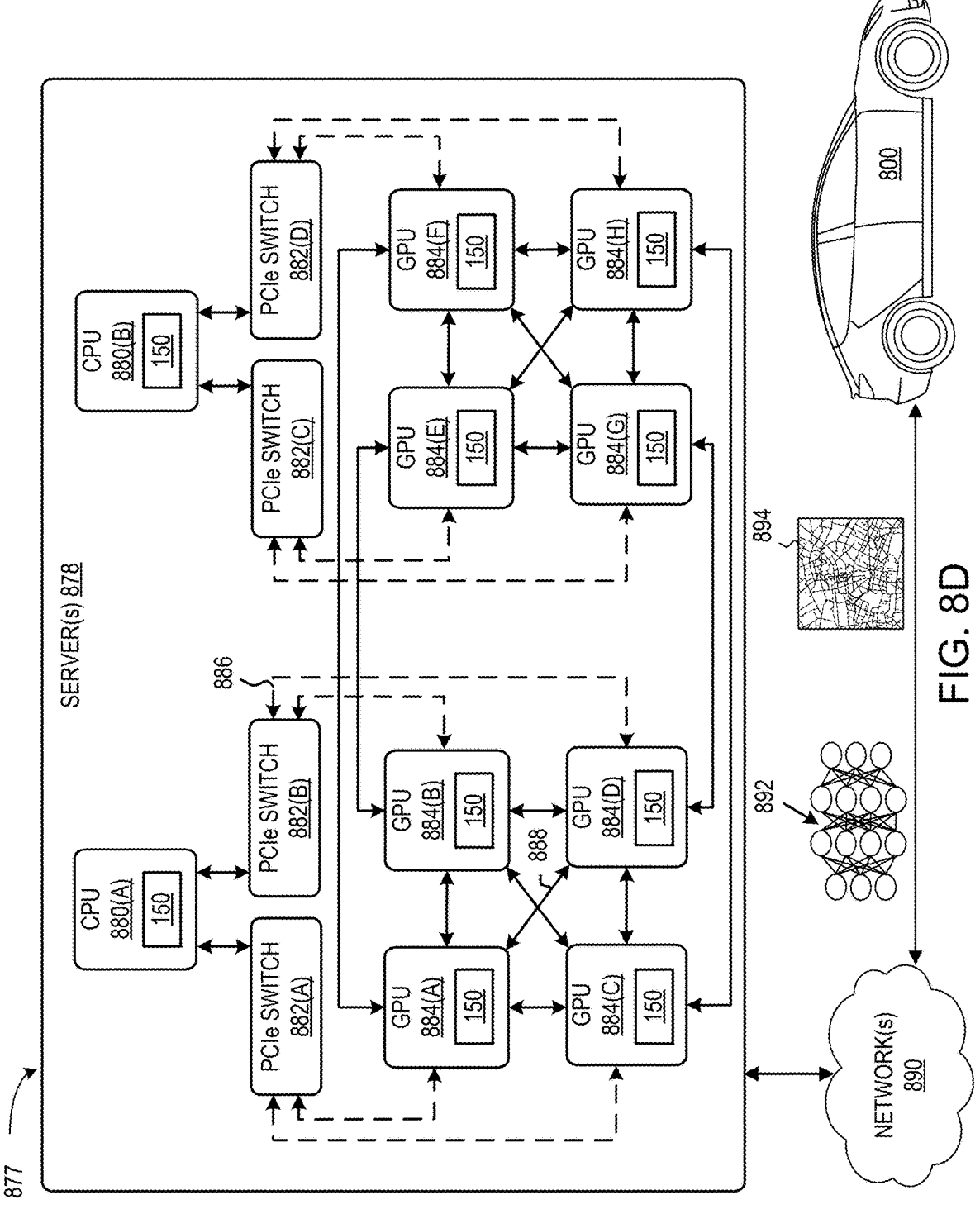
FIG. 8D is a diagram illustrating a system for communication between cloud-based server(s) and the autonomous vehicle of FIG. 8A, according to at least one embodiment.

FIG. 8D is a diagram of a system 877 for communication between cloud-based server(s) and autonomous vehicle 800 of FIG. 8A, according to at least one embodiment. In at least one embodiment, system 877 may include, without limitation, server(s) 878, network(s) 890, and any number and type of vehicles, including vehicle 800. In at least one embodiment, server(s) 878 may include, without limitation, a plurality of GPUs 484 (A)-484 (H) (collectively referred to herein as GPUs 484), PCIe switches 482 (A)-482 (D) (collectively referred to herein as PCIe switches 482), and/or CPUs 480 (A)-480 (B) (collectively referred to herein as CPUs 480). In at least one embodiment, GPUs 884, CPUs 880, and PCIe switches 882 may be interconnected with high-speed interconnects such as, for example and without limitation, NVLink interfaces 888 developed by NVIDIA and/or PCIe connections 886. In at least one embodiment, GPUs 884 are connected via an NVLink and/or NVSwitch SoC and GPUs 884 and PCIe switches 882 are connected via PCIe interconnects. Although eight GPUs 884, two CPUs 880, and four PCIe switches 882 are illustrated, this is not intended to be limiting. In at least one embodiment, each of server(s) 878 may include, without limitation, any number of GPUs 884, CPUs 880, and/or PCIe switches 882, in any combination. For example, in at least one embodiment, server(s) 878 could each include eight, sixteen, thirty-two, and/or more GPUs 884.

In at least one embodiment, server(s) 878 may receive, over network(s) 890 and from vehicles, image data representative of images showing unexpected or changed road conditions, such as recently commenced road-work. In at least one embodiment, server(s) 878 may transmit, over network(s) 890 and to vehicles, neural networks 892, updated or otherwise, and/or map information 894, including, without limitation, information regarding traffic and road conditions. In at least one embodiment, updates to map information 894 may include, without limitation, updates for HD map 822, such as information regarding construction sites, potholes, detours, flooding, and/or other obstructions. In at least one embodiment, neural networks 892, and/or map information 894 may have resulted from new training and/or experiences represented in data received from any number of vehicles in an environment, and/or based at least in part on training performed at a data center (e.g., using server(s) 878 and/or other servers).

In at least one embodiment, server(s) 878 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 890), and/or machine learning models may be used by server(s) 878 to remotely monitor vehicles.

In at least one embodiment, server(s) 878 may receive data from vehicles and apply data to up-to-date real-time neural networks for real-time intelligent inferencing. In at least one embodiment, server(s) 878 may include deep-learning supercomputers and/or dedicated AI computers powered by GPU(s) 884, such as a DGX and DGX Station machines developed by NVIDIA. However, in at least one embodiment, server(s) 878 may include deep learning infrastructure that uses CPU-powered data centers.

In at least one embodiment, deep-learning infrastructure of server(s) 878 may be capable of fast, real-time inferencing, and may use that capability to evaluate and verify health of processors, software, and/or associated hardware in vehicle 800. For example, in at least one embodiment, deep-learning infrastructure may receive periodic updates from vehicle 800, such as a sequence of images and/or objects that vehicle 800 has located in that sequence of images (e.g., via computer vision and/or other machine learning object classification techniques). In at least one embodiment, deep-learning infrastructure may run its own neural network to identify objects and compare them with objects identified by vehicle 800 and, if results do not match and deep-learning infrastructure concludes that AI in vehicle 800 is malfunctioning, then server(s) 878 may transmit a signal to vehicle 800 instructing a fail-safe computer of vehicle 800 to assume control, notify passengers, and complete a safe parking maneuver.

In at least one embodiment, server(s) 878 may include GPU(s) 884 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) implementing pixel density component 150 are used to perform one or more embodiments. Details regarding pixel density component 150 are provided herein in conjunction with FIG. 1.

Figure 9:
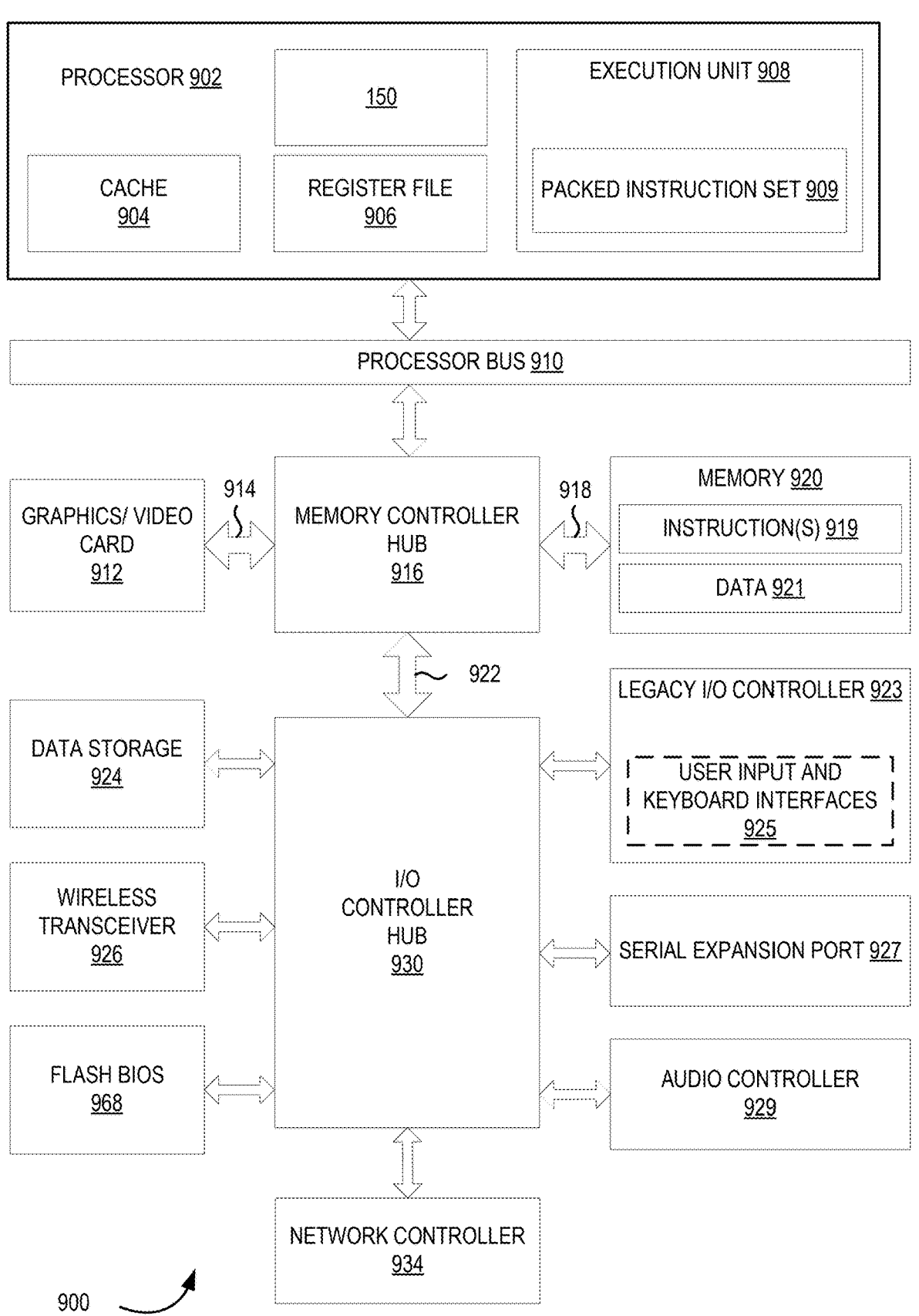
FIG. 9 is a block diagram illustrating a computer system, according to at least one embodiment.

FIG. 9 is a block diagram illustrating an example computer system, which may be a system with interconnected devices and components, a system-on-a-chip (SOC) or some combination thereof formed with a processor that may include execution units to execute an instruction, according to at least one embodiment. In at least one embodiment, a computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform image processing and pixel density computations according to techniques described herein. In at least one embodiment, computer system 900 is a single processor desktop or server system, but in another embodiment, computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, a register file 906 may store different types of data in various registers including, without limitation, integer registers, floating point registers, status registers, and an instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor, along with associated circuitry to execute instructions, operations used by many multimedia applications may be performed using packed data in processor 902. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be a Dynamic Random Access Memory ("DRAM") device, a Static Random Access Memory ("SRAM") device, a flash memory device, or another memory device. In at least one embodiment, memory 920 may store instruction(s) 919 and/or data 921 represented by data signals that may be executed by processor 902.

In at least one embodiment, a system logic chip may be coupled to processor bus 910 and memory 920. In at least one embodiment, a system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O interface 922. In at least one embodiment, a system logic chip may provide a graphics port for coupling to a graphics controller. In at least one embodiment, MCH 916 may be coupled to memory 920 through high bandwidth memory path 918 and a graphics/video card 912 may be coupled to MCH 916 through an Accelerated Graphics Port ("AGP") interconnect 914.

In at least one embodiment, computer system 900 may use system I/O interface 922 as a proprietary hub interface bus to couple MCH 916 to an I/O controller hub ("ICH") 930. In at least one embodiment, ICH 930 may provide direct connections to some I/O devices via a local I/O bus. In at least one embodiment, a local I/O bus may include, without limitation, a high-speed I/O bus for connecting peripherals to memory 920, a chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as a Universal Serial Bus ("USB") port, and a network controller 934. In at least one embodiment, data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an example SoC. In at least one embodiment, devices illustrated in FIG. 9 may be interconnected with proprietary interconnects, standardized interconnects (e.g., PCIe) or some combination thereof. In at least one embodiment, one or more components of computer system 900 are interconnected using compute express link (CXL) interconnects.

Pixel density component 150 may be used to perform image processing operations, including pixel density computations, associated with one or more embodiments. Details regarding pixel density component 150 are provided herein in conjunction with FIG. 1. In at least one embodiment, pixel density component 150 may be used in the system architecture of FIG. 9 for performing image processing operations, including pixel density computations.

Figure 10:
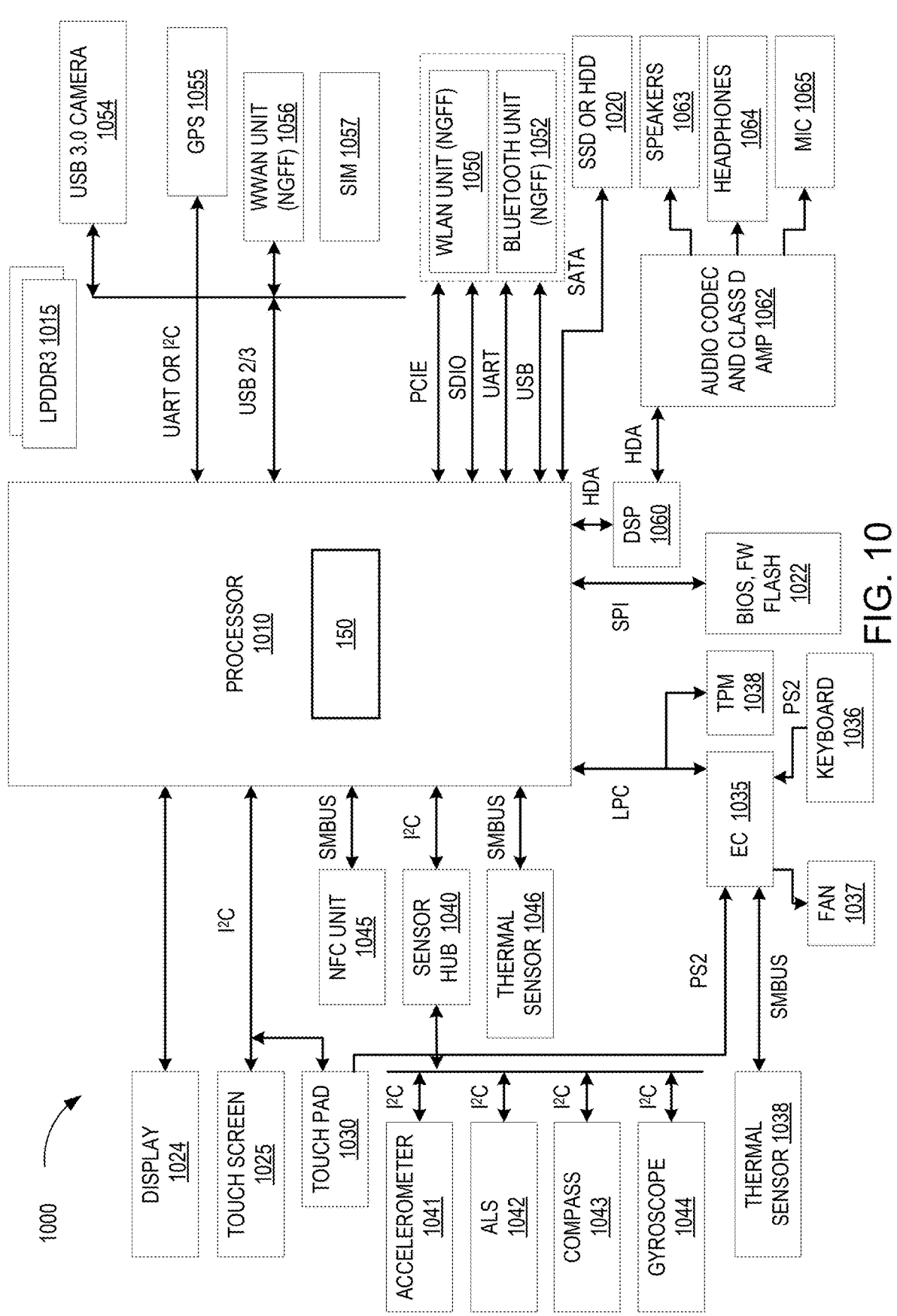
FIG. 10 is a block diagram illustrating a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 is coupled using a bus or interface, such as a I²C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an example SoC. In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 8 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) unit 1055, a camera ("USB 3.0 camera") 1054 such as a USB 3.0 camera, and/or a Low Power Double Data Rate ("LPDDR") memory unit ("LPDDR3") 1015 implemented in, for example, an LPDDR3 standard. These components may each be implemented in any suitable manner.

In at least one embodiment, other components may be communicatively coupled to processor 1010 through components described herein. In at least one embodiment, an accelerometer 1041, an ambient light sensor ("ALS") 1042, a compass 1043, and a gyroscope 1044 may be communicatively coupled to sensor hub 1040. In at least one embodiment, a thermal sensor 1039, a fan 1037, a keyboard 1036, and touch pad 1030 may be communicatively coupled to EC 1035. In at least one embodiment, speakers 1063, headphones 1064, and a microphone ("mic") 1065 may be communicatively coupled to an audio unit ("audio codec and class D amp") 1062, which may in turn be communicatively coupled to DSP 1060. In at least one embodiment, audio unit 1062 may include, for example and without limitation, an audio coder/decoder ("codec") and a class D amplifier. In at least one embodiment, a SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Pixel density component 150 may be used to perform image processing operations, including pixel density computations, associated with one or more embodiments. Details regarding pixel density component 150 are provided herein in conjunction with FIG. 1. In at least one embodiment, pixel density component 150 may be used in the system architecture of FIG. 10 for performing image processing operations, including pixel density computations.

Figure 11:
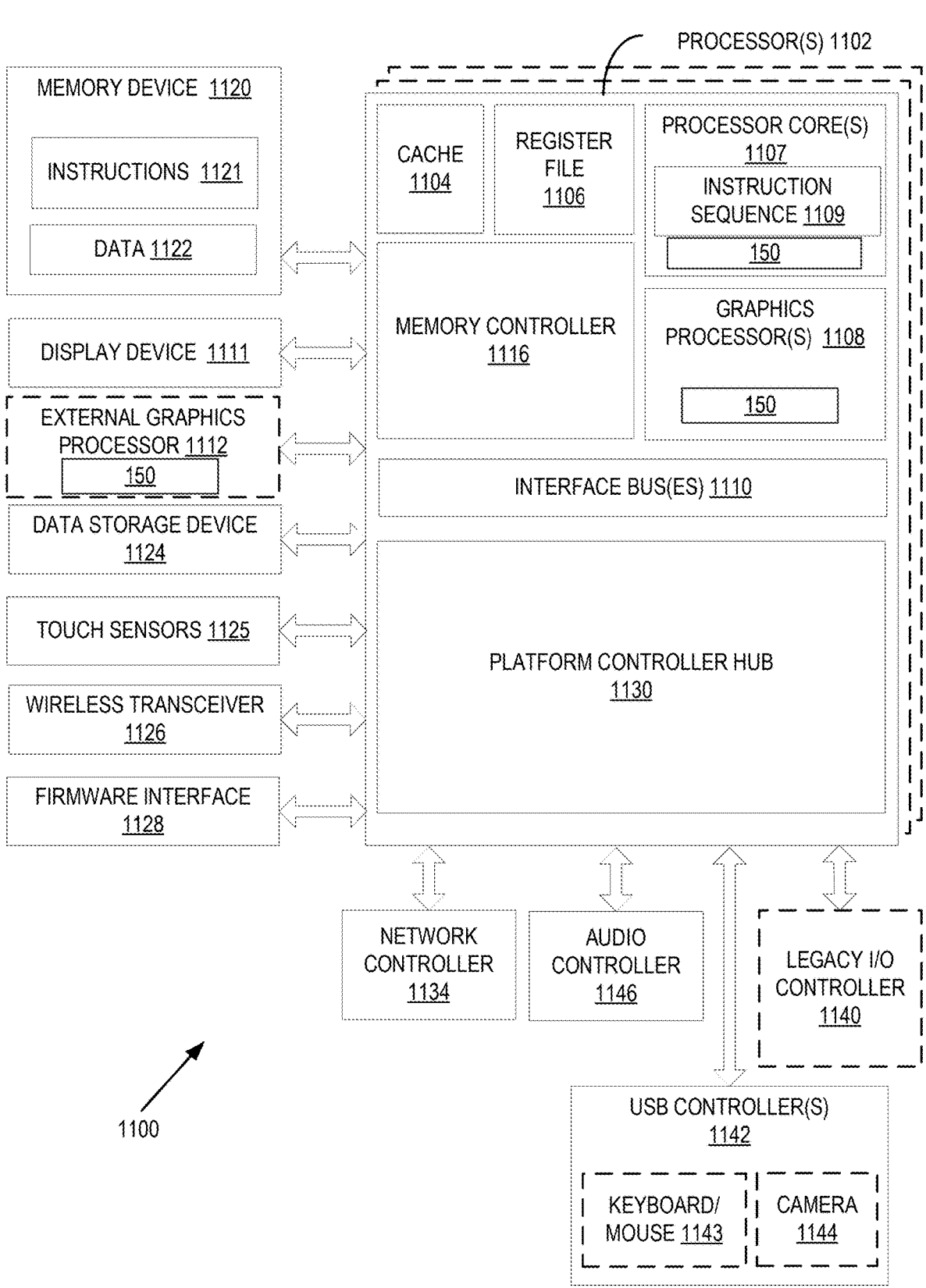
FIG. 11 illustrates at least portions of a graphics processor, according to at least one embodiment.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, a smart phone, a tablet computing device or a mobile Internet device. In at least one embodiment, processing system 1100 can also include, couple with, or be integrated within a wearable device, such as a smart watch wearable device, a smart eyewear device, an augmented reality device, or a virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction sequence 1109. In at least one embodiment, instruction sequence 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction sequence 1109, which may include instructions to facilitate emulation of other instruction sequences. In at least one embodiment, processor core 1107 may also include other processing devices, such a Digital Signal Processor (DSP).

In at least one embodiment, processor 1102 includes a cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, a register file 1106 is additionally included in processor 1102, which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110 can be a processor bus, such as a version of a Direct Media Interface (DMI) bus. In at least one embodiment, interface bus 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, a memory device 1120 can be a dynamic random access memory (DRAM) device, a static random access memory (SRAM) device, flash memory device, phase-change memory device, or some other memory device having suitable performance to serve as process memory. In at least one embodiment, memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment, display device 1111 can include one or more of an internal display device, as in a mobile electronic device or a laptop device, or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system 1100. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Pixel density component 150 may be used to perform image processing operations, including pixel density computations, associated with one or more embodiments. Details regarding pixel density component 150 are provided herein in conjunction with FIG. 1. In at least one embodiment, pixel density component 150 may be used in the system architecture of FIG. 11 for performing image processing operations, including pixel density computations.

Figure 12:
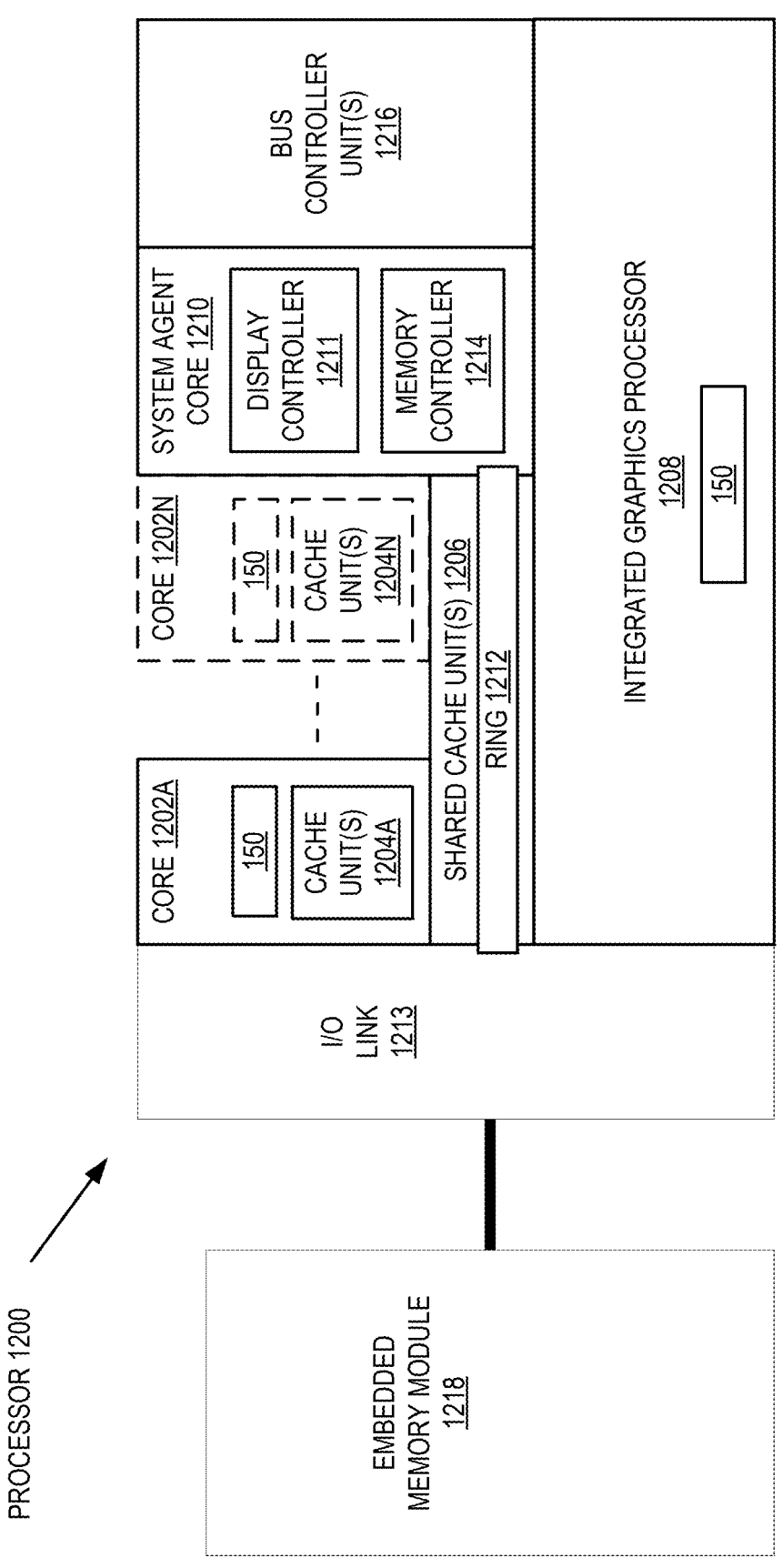
FIG. 12 illustrates at least portions of a graphics processor, according to at least one embodiment.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring-based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 2113.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory module 1218 as a shared Last Level Cache.

In at least one embodiment, processor cores 1202A-1202N are homogeneous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Pixel density component 150 may be used to perform image processing operations, including pixel density computations, associated with one or more embodiments. Details regarding pixel density component 150 are provided herein in conjunction with FIG. 1. In at least one embodiment, pixel density component 150 may be incorporated into graphics processor 1208. For example, in at least one embodiment, image processing and/or pixel density computations described herein may use one or more of ALUs embodied in a 3D pipeline, graphics core(s) 1202, shared function logic, or other logic in FIG. 12. Moreover, in at least one embodiment, image processing and/or pixel density computations described herein may be done using logic other than logic illustrated in FIG. 1. In at least one embodiment, parameters may be stored in on-chip or off-chip memory and/or registers (shown or not shown) that configure ALUs of processor 1200 to perform one or more image processing and/or pixel density techniques described herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
processing a first synthetic image comprising a first pattern and a second synthetic image comprising a second pattern to generate a stitched image comprising a modified version of the first synthetic image and a modified version of the second synthetic image, wherein one or more features of the first pattern are deformed in the modified version of the first synthetic image and one or more features of the second pattern are deformed in the modified version of the second synthetic image;
determining pixel areas for one or more features of the modified version of the first synthetic image and for one or more features of the modified version of the second synthetic image; and
determining one or more feature densities for one or more regions of the stitched image based at least on the determined pixel areas.

2. The method of claim 1, wherein the determining the one or more feature densities for the one or more regions of the stitched image comprises:
determining the one or more feature densities based at least on area ratios between the pixel areas of the one or more features of the modified version of the first synthetic image and the second synthetic image and corresponding pixel areas of the one or more features of the first synthetic image and the second synthetic image, wherein the area ratios indicate magnification levels of respective features.

3. The method of claim 1, wherein the one or more feature densities are determined at one or more stages of an image stitching pipeline.

4. The method of claim 1, further comprising:
responsive to determining that one or more feature densities within a first area of the stitched image are below a first threshold density, adjusting a first parameter associated with a stitching algorithm that generates the stitched images; and
responsive to determining that one or more feature densities within a second area of the stitched image are below a second threshold density, adjusting a second parameter associated with the stitching algorithm.

5. The method of claim 1, wherein the determining the pixel areas for the one or more features of the modified version of the first synthetic image and for the one or more features of the modified version of the second synthetic image comprises:

performing a thresholding process on the stitched image to obtain a binary image, wherein the one or more features of the modified version of the first synthetic image and the one or more features of the modified version of the second synthetic image are classified as foreground objects;

providing the binary image as input to a connected components algorithm, wherein the connected components algorithm provides, as output, a labeled image comprising a plurality of connected components, wherein at least one connected component is assigned a unique identifier corresponding to a feature of the modified version of the first synthetic image or a feature of the modified version of the second synthetic image; and determining pixel areas for each connected component using one or more shape analysis algorithms.

6. The method of claim 5, further comprising:

determining orientations of each connected component using a co-variance matrix of associated pixel coordinates, wherein the orientations indicate a direction of deformation associated with the deformed features of the first pattern or the deformed features of the second pattern.

7. The method of claim 1, further comprising:

generating a vector map based at least on the pixel areas of the one or more features of the modified version of the first synthetic image and the second synthetic image and associated orientations of the one or more features of the first synthetic image and the second synthetic image.

8. The method of claim 1, wherein the first pattern and the second pattern comprise a plurality of shapes arranged in a grid.

9. The method of claim 1, wherein the first synthetic image and the second synthetic image are a same image comprising a same pattern.

10. The method of claim 1, further comprising:

generating the first synthetic image and the second synthetic image.

11. A system comprising:

a plurality of image capture devices;

one or more processors operatively coupled to the plurality of image capture devices, wherein the one or more processors are to:

process a first synthetic image comprising a first pattern and a second synthetic image comprising a second pattern to generate a stitched image comprising a modified version of the first synthetic image and a modified version of the second synthetic image, wherein one or more features of the first pattern are deformed in the modified version of the first synthetic image and one or more features of the second pattern are deformed in the modified version of the second synthetic image;

determine pixel areas for one or more features of the modified version of the first synthetic image and for one or more features of the modified version of the second synthetic image; and determine one or more feature densities for one or more regions of the stitched image based at least on the determined pixel areas.

12. The system of claim 11, wherein to determine the one or more feature densities for one or more regions of the stitched image based at least on the determined pixel areas, the one or more processors are to:

determine the one or more feature densities based at least on area ratios between the pixel areas of the features of the modified version of the first synthetic image and the second synthetic image and corresponding pixel areas of the one or more features of the first synthetic image and the second synthetic image, wherein the area ratios indicate magnification levels of respective features.

13. The system of claim 11, wherein the one or more feature densities are determined at one or more stages of an image stitching pipeline.

14. The system of claim 11, wherein the one or more processors are further to:

responsive a determination that one or more feature densities within a first area of the stitched image are below a first threshold density, adjust a first parameter associated with a stitching algorithm that generates the stitched images; and responsive to a determination that one or more feature densities within a second area of the stitched image are below a second threshold density, adjust a second parameter associated with the stitching algorithm.

15. The system of claim 11, wherein to determine pixel areas for the one or more features of the modified version of the first synthetic image and for the one or more features of the modified version of the second synthetic image, the one or more processors are to:

perform a thresholding process on the stitched image to obtain a binary image, wherein the one or more features of the modified version of the first synthetic image and the one or more features of the modified version of the second synthetic image are classified as foreground objects;

provide the binary image as input to a connected components algorithm, wherein the connected components algorithm provides, as output, a labeled image comprising a plurality of connected components, wherein each connected component is assigned a unique identifier corresponding to a feature of the modified version of the first synthetic image or a feature of the modified version of the second synthetic image; and determine pixel areas for each connected component using one or more shape analysis algorithms.

16. The system of claim 15, wherein the one or more processors are further to:

determine orientations of each connected component using a co-variance matrix of associated pixel coordinates, wherein the orientations indicate a direction of deformation associated with the deformed features of the first pattern or the deformed features of the second pattern.

17. The system of claim 11, wherein the one or more processors are further to:

generate a vector map based on the pixel areas of the features of the modified version of the first synthetic image and the second synthetic image and associated orientations of the features of the first synthetic image and the second synthetic image.

18. The system of claim 11, wherein the first pattern and the second pattern comprise a plurality of shapes arranged in a grid.

19. The system of claim 11, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system for presenting at least one of augmented reality content, virtual reality content, or mixed reality content;

a system for hosting one or more real-time streaming applications;

a system implemented using an edge device;

a system implemented using a robot;

a system for performing one or more conversational AI operations;

a system implementing one or more language models;

a system implementing one or more large language models (LLMs);

a system implementing one or more visual language models (VLMs);

a system for performing one or more generative AI operations;

a system for generating synthetic data;

a system incorporating one or more virtual machines (VMs);

a system implemented at least partially in a data center; or a system implemented at least partially using cloud computing resources.

20. One or more processors comprising processing circuitry to:

process a first synthetic image comprising a first pattern and a second synthetic image comprising a second pattern to generate a stitched image comprising a modified version of the first synthetic image and a modified version of the second synthetic image, wherein one or more features of the first pattern are deformed in the modified version of the first synthetic image and one or more features of the second pattern are deformed in the modified version of the second synthetic image;

determine pixel areas for one or more features of the modified version of the first synthetic image and for one or more features of the modified version of the second synthetic image; and determine feature densities for one or more regions of the stitched image based at least on the determined pixel areas.

*  *  *  *  *